United States Patent
Ohseki et al.

(10) Patent No.: US 12,096,485 B2
(45) Date of Patent: Sep. 17, 2024

(54) TERMINAL APPARATUS, BASE STATION APPARATUS, CONTROL METHOD, AND COMPUTER-READABLE STORAGE MEDIUM FOR EXECUTING RANDOM ACCESS PROCEDURE

(71) Applicant: KDDI CORPORATION, Tokyo (JP)

(72) Inventors: Takeo Ohseki, Fujimino (JP); Issei Kanno, Fujimino (JP); Yasuhiro Suegara, Fujimino (JP); Masahito Umehara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 256 days.

(21) Appl. No.: 17/397,030

(22) Filed: Aug. 9, 2021

(65) Prior Publication Data

US 2021/0392700 A1 Dec. 16, 2021

Related U.S. Application Data

(63) Continuation of application No. PCT/JP2019/025797, filed on Jun. 28, 2019.
(Continued)

(51) Int. Cl.
*H04W 74/0833* (2024.01)
*H04W 72/044* (2023.01)
(Continued)

(52) U.S. Cl.
CPC ..... *H04W 74/0841* (2013.01); *H04W 72/044* (2013.01); *H04W 74/0836* (2024.01); *H04W 76/10* (2018.02)

(58) Field of Classification Search
None
See application file for complete search history.

(56) References Cited

U.S. PATENT DOCUMENTS 11,997,720 B2  5/2024  Futaki
2018/0110075 A1  4/2018  Ly et al.
(Continued)

FOREIGN PATENT DOCUMENTS

WO  WO-2018/127549 A1  7/2018
WO  WO-2018/139575 A1  8/2018
(Continued)

OTHER PUBLICATIONS

ZTE Corporation, Sanechips, "New work item: 2-step RACH for NR", 3GPP TSG RAN Meeting #82 RP-182894, Dec. 2018, 5 pages.
(Continued)

*Primary Examiner* — Marcus Smith
(74) *Attorney, Agent, or Firm* — Foley & Lardner LLP

(57) ABSTRACT

A terminal apparatus, which executes a two-step random access procedure or a four-step random access procedure to establish a connection with a base station apparatus, executes control such that, in a case where a first message of the two-step random access procedure including a preamble and predetermined information for connection establishment is transmitted and a number of unsuccessful attempts to receive the first message by the base station apparatus exceeds a predetermined number, the terminal apparatus transmits a second message to be transmitted from the terminal apparatus to the base station apparatus in the four-step random access procedure.

17 Claims, 12 Drawing Sheets

Related U.S. Application Data

(60) Provisional application No. 62/805,059, filed on Feb. 13, 2019.

(51) Int. Cl.
*H04W 74/0836* (2024.01)
*H04W 76/10* (2018.01)

(56) References Cited

U.S. PATENT DOCUMENTS

| | | | |
|---|---|---|---|
| 2020/0146069 A1* | 5/2020 | Chen | H04W 52/362 |
| 2021/0243814 A1* | 8/2021 | Zhang | H04W 74/0833 |
| 2021/0337597 A1 | 10/2021 | Yoshimura et al. | |
| 2021/0385867 A1 | 12/2021 | Futaki | |
| 2022/0095379 A1* | 3/2022 | Xiong | H04W 74/0833 |
| 2022/0279597 A1* | 9/2022 | Takeda | H04L 1/189 |

FOREIGN PATENT DOCUMENTS

| | | |
|---|---|---|
| WO | WO-2020/084878 A1 | 4/2020 |
| WO | WO-2020/163239 A1 | 8/2020 |

OTHER PUBLICATIONS

Qualcomm Incorporated, "2-step RACH procedure consideration", 3GPP TSG-RAN WG1 NR AdHoc R1-1700792, Jan. 2017, 6 pages.
Media Tek Inc, "Further considerations on 2-step RACH", 3GPP TSG-RAN WG2 Meeting #103bis R2-1813965, Oct. 2018, 9 pages.
ASUSTek: "Consideration on fallback of 2-step RACH procedure," 3GPP Draft, R2-1700358 Consideration on Fallback of 2-Step RACH Procedure, 3rd Generation Partnership Project (3GPP), Mobile Competence Centre, 650, Route Des Lucioles, F-06921 Sophia-Antipolis Cedex, France vol. RAN WG2, No. Spokane, USA; 20170117-20170119 Jan. 17, 2017 Retrieved from the Internet: URL:http://www.3gpp.org/ftp/Meetings_3GPP_SYNC/RAN2/Docs/ [retrieved on Jan. 17, 2017] (4 pages).
EP Search Report on EP Appl. Ser. No. EP 19914948 dated Apr. 5, 2022 (14 pages).
Sony: "2-step RACH to 4-step RACH fallback", 3GPP Draft; R2-1700137 2-4-STEP-FALLBACK, 3rd Generation Partnership Project (3GPP), Mobile Competence Centre, 650, Route Des Lucioles, F-06921 Sophia-Antipolis Cedex, France, vol. RAN WG2, No. Spokane, USA; 20170117-20170119 Jan. 17, 2017, Retrieved from the Internet: URL:http://www.3gpp.org/ftp/Meetings_3GPP_SYNC/RAN2/Docs/ [retrieved on Jan. 17, 2017] (3 pages).
Sony: "Considerations on initial access procedures for NR unlicensed," 3GPP Draft, R2-1817075_Considerations on Initial Access for NR_U_1.0, 3rd Generation Partnership Project (3GPP), Mobile Competence Centre, 650, Route Des Lucioles, F-06921 Sophia-Antipolis, France, vol. RAN WG2, No. Spokane, USA; 20181112-20181116, Nov. 12, 2018 Retrieved from the Internet: URL:http://www.3gpp.org/ftp/Meetings%5F3GPP%5FSYNC/RAN2/Docs/R2%2DI817075%2Ezip [retrieved on Nov. 12, 2018] (4 pages).
ZTE Corporation et al., "Msg2 payload contents for 2-step RACH," 3GPP Draft; R2-1817064_R2, 3rd Generation Partnership Project (3GPP), Mobile Competence Centre, 650, Route Des Lucioles, F-06921 Sophia-Antipolis Cedex, France, Nov. 2, 2018 Retrieved from the Internet: URL:http://www.3gpp.org/ftp/tsg%5Fran/WG2%5FRL2/TSGR2%5FI04/Docs/R2%2DI817064%2Ezip [retrieved on Nov. 2, 2018] (pp. 1-9).
Japanese Office Action dated Jun. 3, 2024 concerning the corresponding Japanese Patent Application No. 2023-090168.
ZTE Corporation, Sanechips, "Msg2 payload contents for 2-step RACH"[online], 3GPP TSG-RAN WG2 Meeting#103-bis / R2-1814034, Internet <URL:http://www.3gpp.org/ftp/tsg_ran/WG2_RL2/TSGR2_103bis/Docs/R2, 09 months, 2 months, and 27 days 1814034.zip>, 2018.
MediaTek Inc., "2-step RACH msgA and msgB contents" [online], 3GPP TSG-RAN WG2 Meeting#104 R2-1816685, Internet <URL:http://www.3gpp.org/ftp/tsg_ran/WG2_RL2/TSGR2_104/Docs/R2-1816685.zip>, Nov. 1, 2018.
Interdigital Communications: "Random Access Procedure in NR", 3GPP Draft; R2-168465_RA Procedure, 3rd Generation Partnership Project (3GPP), Mobile Competence Centre; 3GPP TSG-RAN WG2 #96, Reno, USA, Nov. 14-18, 2016, XP051178055, Retrieved from the Internet: URL: http://www.3gpp.org/ftp/Meetings_3GPP_SYNC/RAN2/Docs/ [retrieved on Nov. 13, 2016].
Office Action for European Patent Application No. 19914948.5 dated Jul. 23, 2024 (9 pages).

* cited by examiner

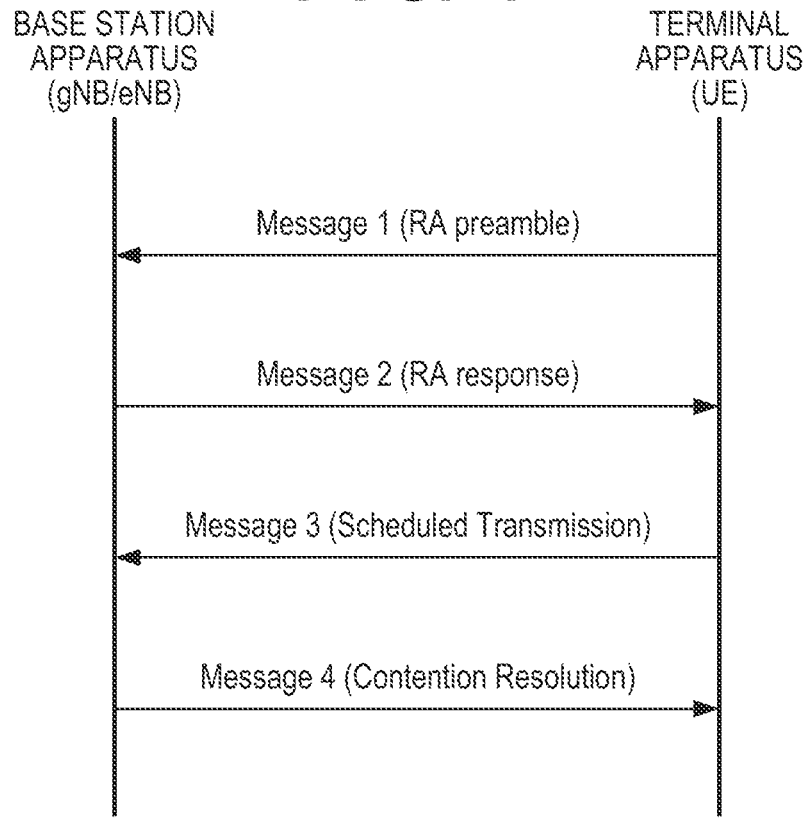
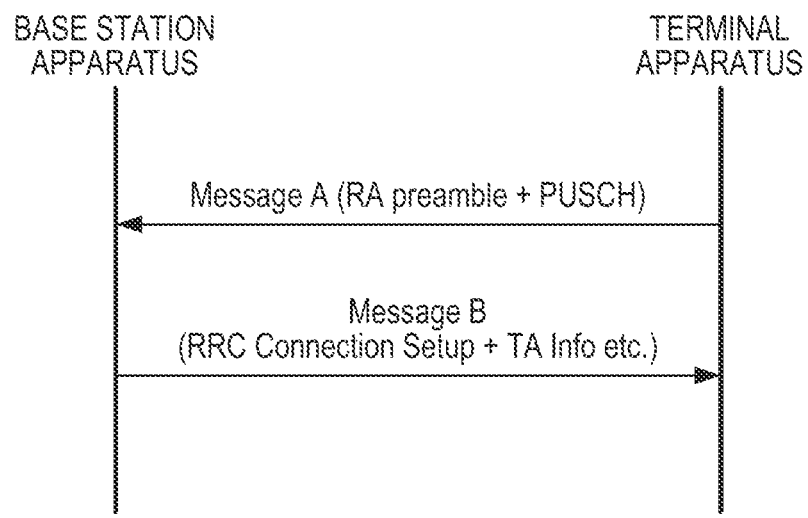

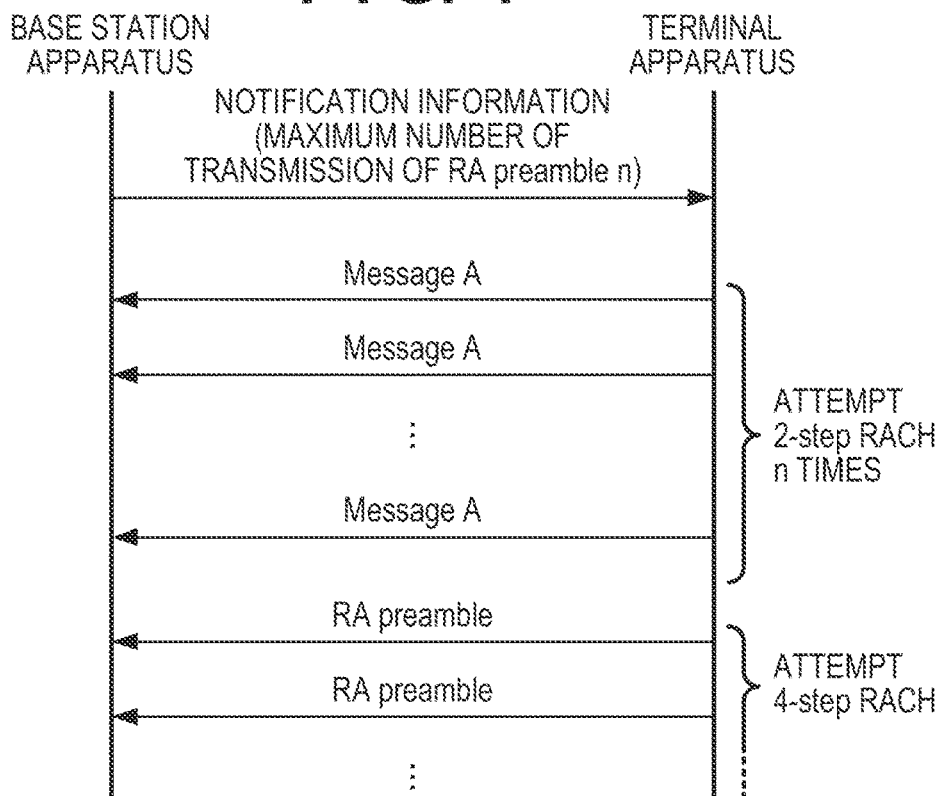
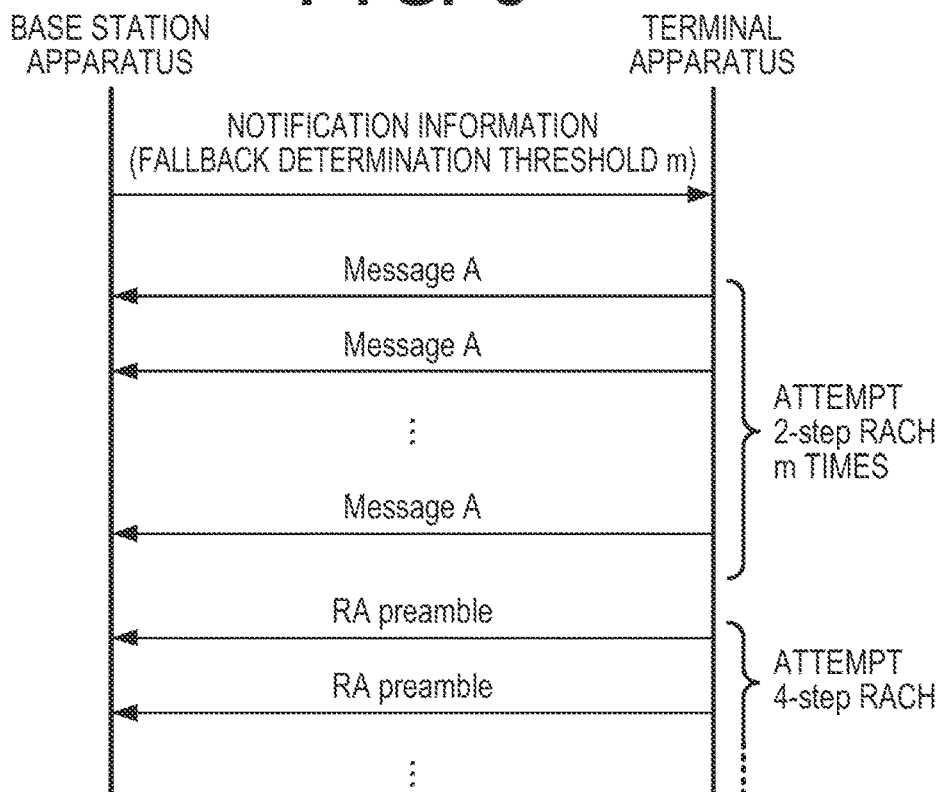

TERMINAL APPARATUS, BASE STATION APPARATUS, CONTROL METHOD, AND COMPUTER-READABLE STORAGE MEDIUM FOR EXECUTING RANDOM ACCESS PROCEDURE

CROSS-REFERENCE TO RELATED APPLICATION(S)

This application is a continuation of International Patent Application No. PCT/JP2019/025797 filed on Jun. 28, 2019, which claims priority to and the benefit of U.S. Provisional Patent Application No. 62/805,059 filed on Feb. 13, 2019, the entire disclosures of which are incorporated herein by reference.

BACKGROUND OF THE INVENTION

Field of the Invention

The present invention relates to a terminal apparatus, a base station apparatus, a control method, and a program and in particular relates to random access procedure enhancing technology.

Description of the Related Art

Wireless communication system standards for Long-Term Evolution (LTE), Fifth Generation (5G) New Radio (NR), and the like are set by the 3rd Generation Partnership Project (3GPP). For LTE and NR, a random access procedure is specified for initial connection between a terminal apparatus and a base station apparatus. Conventional random access procedures include four-step processing.

A processing example of the four-step random access procedure is illustrated in FIG. 1. In the four-step random access procedure, first, a terminal apparatus (user equipment, UE) transmits a random-access (RA) preamble as a first message (message 1) to a base station apparatus. Here, the base station apparatus is indicated by gNB in the case of NR and eNB in the case of LTE, for example. Note that the RA preamble is transmitted using predetermined radio resources (frequency and time resources). When an RA preamble is detected, the base station apparatus transmits an RA response as a second message (message 2) to the terminal apparatus. Message 2 includes information including radio resources used in transmitting a third message (message 3) and parameters for when signals are transmitted to be transmitted after the message 2 is received. Also, the message 2 includes various information including timing advance (TA) for synchronizing the timings of the signals. The terminal apparatus uses the radio resources and pieces of information designated by this information, and, as the message 3, predetermined information for establishing initial access is transmitted from the terminal apparatus to the base station apparatus. Also, replying to the message 3, the base station apparatus transmits a fourth message to the terminal apparatus. Via this procedure, initial connection is established between the terminal apparatus and the base station apparatus.

In the 3GPP, the use of a two-step random access procedure as illustrated in FIG. 2 to reduce the amount of time needed for the initial connection procedure has become a topic of investigation (see NPL 1). In a two-step random access procedure, the terminal apparatus transmits a message A that corresponds to the message 1 and the message 3 described above and includes RA preamble and a physical uplink shared channel (PUSCH) for transmitting predetermined information for initial access. Also, the base station apparatus is configured to reply to the message A by transmitting a message B that corresponds to the message 2 and the message 4 described above. Via the two-step random access procedure, upon completion of the transmission and reception of the message A and the message B, a connection between the terminal apparatus and the base station apparatus is established. Note that hereinafter, the two-step random access procedure may be referred to as "two-step RACH", and the four-step random access procedure may be referred to as "four-step RACH".

CITATION LIST

Non Patent Literature

NPL1: 3GPP, RP-182894

In two-step RACH, the radio resources (time, frequency, and space) and the transmission parameters (modulation method, coding rate, signal waveform, precoder, and the like) for transmitting the message A cannot be dynamically allocated. Thus, the terminal apparatus may transmit the message A expecting that a reasonably good wireless environment will be obtained for the uplink from the terminal apparatus to the base station apparatus. However, in a case where two-step RACH is normally used, when the actual wireless environment of the uplink is different from the expected wireless environment to an extent that two-step RACH cannot function, the base station apparatus may fail to receive the message A and a connection may be unable to be established. In this case, the terminal apparatus may attempt to repeatedly transmit the message A until the message B is received. However, in a case of a situation where the message A cannot be successfully received by the base station apparatus until the wireless environment is enhanced, connection establishment is delayed by the time taken until the wireless environment is enhanced.

SUMMARY OF THE INVENTION

The present invention provides technology for preventing an increase in the time taken to complete connection in a wireless communication system using two-step random access procedure.

A terminal apparatus according to an aspect of the present invention is a terminal apparatus that executes a two-step random access procedure or a four-step random access procedure to establish a connection with a base station apparatus, wherein, in a case where the terminal apparatus transmits a first message of the two-step random access procedure including a preamble and predetermined information for connection establishment and a number of unsuccessful attempts to receive the first message by the base station apparatus exceeds a predetermined number, the terminal apparatus transmits a second message to be transmitted from the terminal apparatus to the base station apparatus in the four-step random access procedure.

A terminal apparatus according to another aspect of the present invention is a terminal apparatus that executes a two-step random access procedure or a four-step random access procedure to establish a connection with a base station apparatus, wherein, in a case where elapsed time from when the terminal apparatus transmits a first message of the two-step random access procedure including a preamble and predetermined information for connection establishment without reception of a message transmitted from the base station apparatus if the first message is successfully received exceeds a predetermined amount of time, the terminal apparatus transmits a second message to be transmitted from the terminal apparatus to the base station apparatus in the four-step random access procedure.

A base station apparatus according to an aspect of the present invention is a base station that reports a predetermined number to a terminal apparatus such that the terminal apparatus transmits, in a case where the number of unsuccessful attempts to receive a first message transmitted from the terminal apparatus including a preamble and predetermined information for connection establishment of a two-step random access procedure exceeds a predetermined number, a second message to be transmitted in a four-step random access procedure.

A base station apparatus according to another aspect of the present invention is a base station that reports a predetermined amount of time to a terminal apparatus such that the terminal apparatus transmits, in a case where elapsed time from when a first message of a two-step random access procedure including a preamble and predetermined information for connection establishment is transmitted from the terminal apparatus without successful reception of the first message exceeds the predetermined amount of time, a second message to be transmitted in a four-step random access procedure.

A base station apparatus according to yet another aspect of the present invention is a base station that, in a case where, for a first message of a two-step random access procedure transmitted from a terminal apparatus including a preamble and predetermined information for connection establishment, the preamble is detected but a number of unsuccessful attempts to receive the predetermined information exceeds a predetermined number, transmits to the terminal apparatus a message instructing the terminal apparatus to transmit a second message to be transmitted in a four-step random access procedure.

A base station apparatus according to even yet another aspect of the present invention is a base station that, in a case where elapsed time from when a first message of a two-step random access procedure including a preamble and predetermined information for connection establishment is transmitted from a terminal apparatus without successful reception of the predetermined information while the preamble is detected exceeds a predetermined amount of time, transmits to the terminal apparatus a message instructing the terminal apparatus to transmit a second message to be transmitted in a four-step random access procedure.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram schematically illustrating the flow of a four-step random access procedure.

FIG. 2 is a diagram schematically illustrating the flow of a two-step random access procedure.

FIG. 7 is a diagram illustrating an example of the flow of the processing executed by the wireless communication system.

FIG. 8 is a diagram illustrating an example of the flow of the processing executed by the wireless communication system.

DESCRIPTION OF THE EMBODIMENTS

Figure 3:
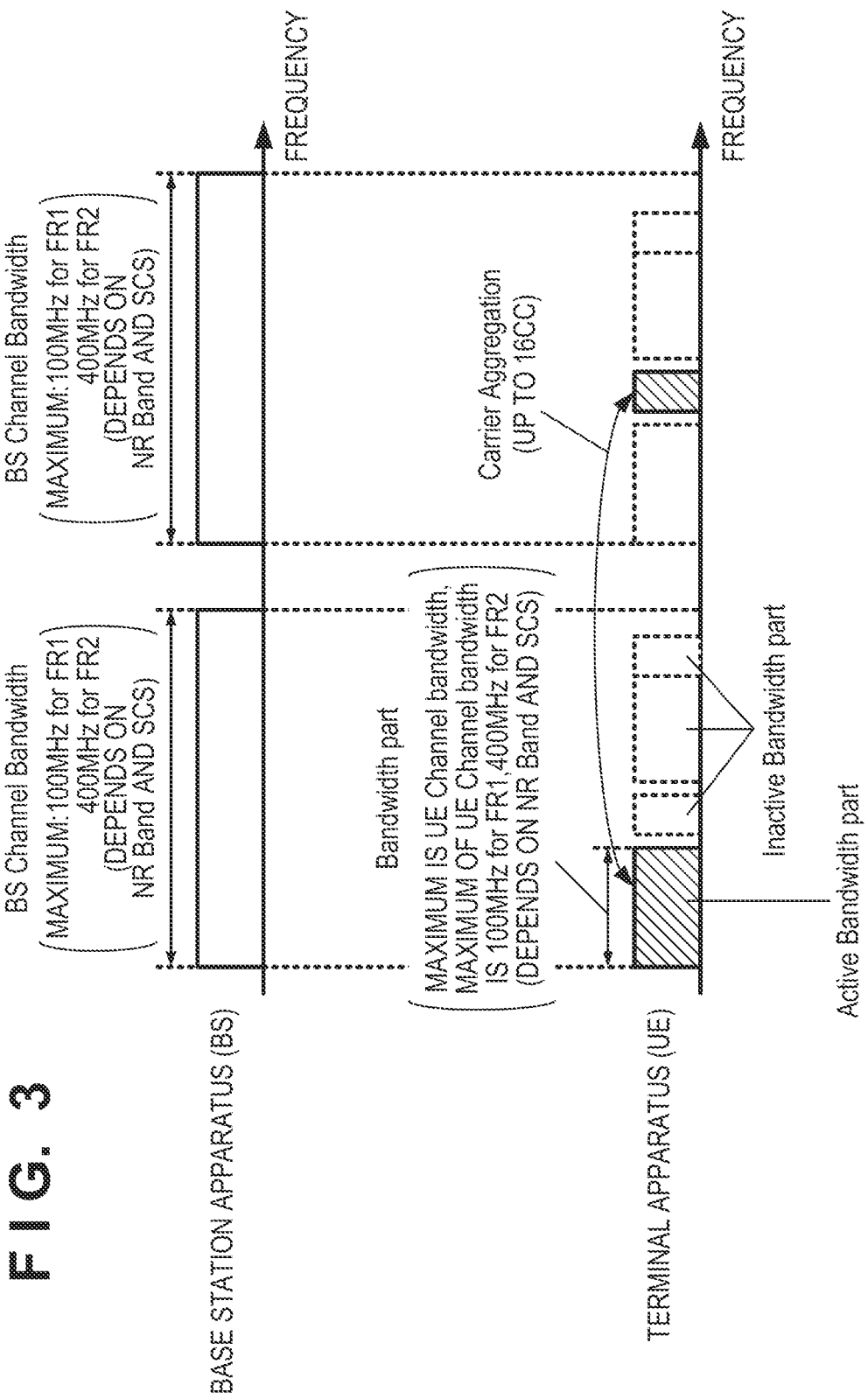
FIG. 3 is a diagram illustrating an example of the relationship between a usable frequency band and bandwidth parts.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

Figure 4:
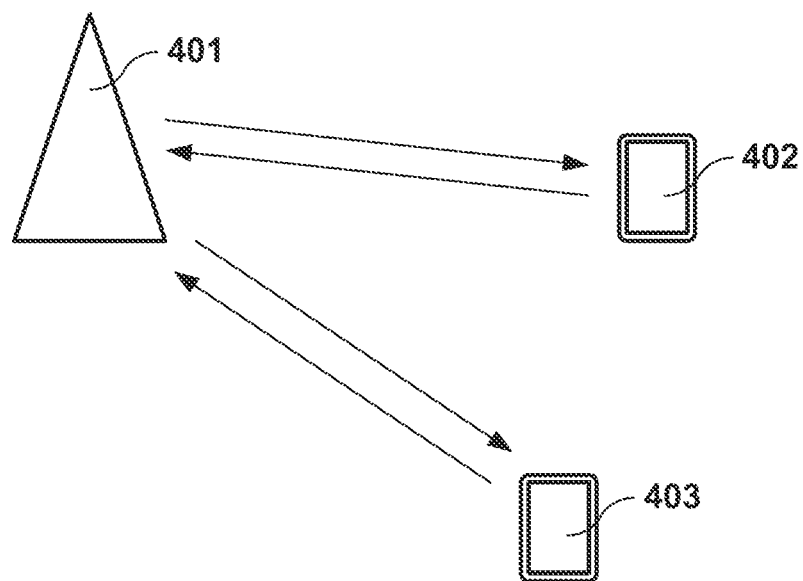
FIG. 4 is a diagram illustrating an example configuration of a wireless communication system.

FIG. 4 is a diagram illustrating an example configuration of a wireless communication system according to the present embodiment. The system of the present embodiment is an example of a 5G cellular communication system. However, no such limitation is intended, and the system of the present embodiment may be a cellular communication system of a 5G successor or a non-cellular wireless communication system. The system of the present embodiment includes a base station apparatus 401, a terminal apparatus 402, and a terminal apparatus 403. Note that in FIG. 4, to facilitate understanding, only one base station apparatus and two terminal apparatuses are illustrated. However, the numbers of the apparatuses is not limited thereto, and more base station apparatuses and terminal apparatuses may be present or only one terminal apparatus may be present.

Communication between the base station apparatus and the terminal apparatus is performed, for example, using a bandwidth part (hereinafter, referred to as "bandwidth part") that is at least a part of the frequency band (system bandwidth, base station channel bandwidth) able to be used in the system. An example configuration of the bandwidth part will be described using FIG. 3. The terminal apparatuses (UE) are each capable of setting a maximum of four bandwidth parts within the system bandwidth, with one of the bandwidth parts being in an active state for communication with the base station apparatus. The terminal apparatus using such a bandwidth part removes the need to constantly modulate and demodulate the entire system bandwidth, and the terminal apparatus and the base station apparatus can communication by only modulating and demodulating the active bandwidth part.

The terminal apparatus 402 and the terminal apparatus 403 according to the present embodiment execute a two-step RACH such as that illustrated in FIG. 2 or execute a four-step RACH such as that illustrated in FIG. 1 to establish a connection with the base station apparatus 401. Note that according to the two-step RACH, because a connection can be established by the terminal apparatus and the base station apparatus each only transmitting a message once, compared to the four-step RACH, a connection between the terminal apparatus and the base station apparatus can be established in a short time. However, with the two-step RACH, in a case where the terminal apparatus transmits the message A as described above and the base station apparatus detects the preamble portion of the message A, demodulation or decoding of the PUSCH portion may fail, resulting in the message B, which is the reply to the message A, being unable to be transmitted. In particular, because the PUSCH portion is expected to be transmitted in a state without the radio resources and the transmission parameters being set appropriately, the base station apparatus may fail to receive the PUSCH portion even in a wireless environment in which the message 3 of a four-step RACH would be successfully received. Thus, in a case where the terminal apparatus normally executes two-step RACH, in an environment in which a four-step RACH would connect successfully, connection may not be established and transmission of the message A may be repeated until the communication environment is changed to an environment conducive to connection establishment. Thus, the time taken to establish a connection may increase. Also, in a case where the terminal apparatus normally executes four-step RACH, even in an environment in which two-step RACH connection establishment can be successful, executing four-step RACH may result in the time taken to establish a connection being unnecessarily increased.

Regarding this, in the present embodiment, in a case where the base station apparatus fails to receive a two-step RACH message A after the message A has been transmitted by the terminal apparatus, the processing transitions to four-step RACH (fallback to four-step RACH). For example, fallback processing is executed on the basis of the number of times the message A has been transmitted reaching a predetermined number without the base station apparatus successfully receiving the message A (without the terminal apparatus receiving the message B). Also, fallback processing is executed on the basis of the time that has elapsed without the base station apparatus successfully receiving the message A (without the terminal apparatus receiving the message B) after the message A has been transmitted reaching a predetermined amount of time. Furthermore, in a case where the base station apparatus has detected the preamble portion of the message A, but the number of times the PUSCH portion has failed to be received (demodulated, decoded) reaches a predetermined number of times or in a case where, after the preamble portion has been detected, the time elapsed without the PUSCH portion being successfully received reaches a predetermined amount of time, an instruction is transmitted to the terminal apparatus to execute four-step RACH.

According to this configuration, the terminal apparatus continuing with the two-step RACH in a state unconducive to two-step RACH connection establishment can be prevented, and the time taken to establish a connection being increased can be prevented via fallback to four-step RACH. Also, because the terminal apparatus initially attempts to connect via two-step RACH, in an environment conducive to connection via two-step RACH, connection with the base station apparatus can be established in a short amount of time.

Hereinafter, the configuration of an apparatus that executes such processing and some embodiments of the processing flow will be described.

First Embodiment

In the present embodiment, the terminal apparatus counts the number of times the terminal apparatus has transmitted the message A via two-step RACH, ends two-step RACH in response to this number reaching a predetermined number, and starts connection processing with four-step RACH.

Apparatus Configuration

Figure 5:
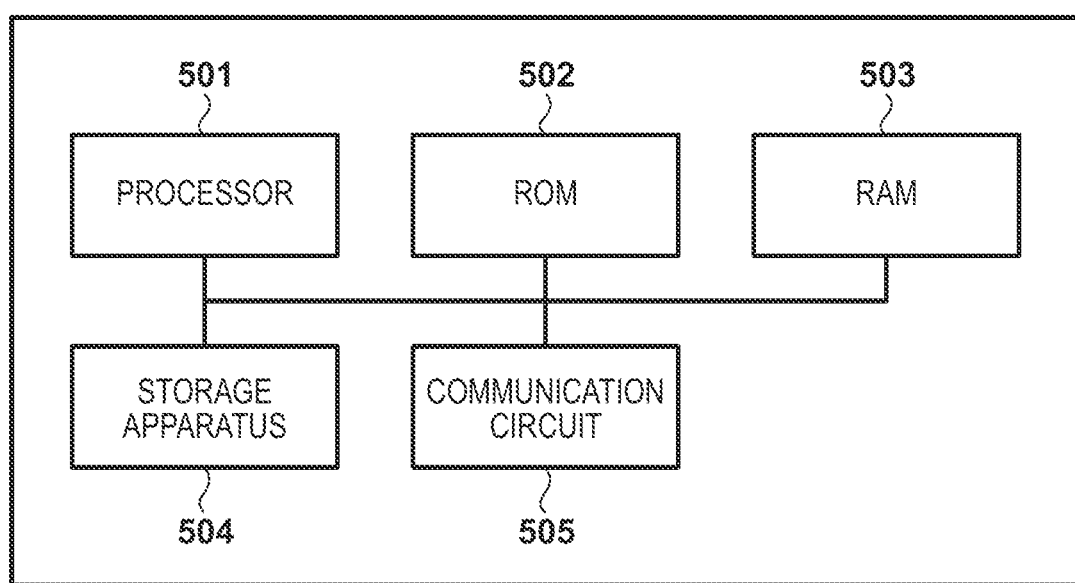
FIG. 5 is a diagram illustrating an example of the hardware configuration of a terminal apparatus and a base station apparatus.

FIG. 5 is a diagram illustrating an example of the hardware configuration of the terminal apparatus and the base station apparatus of the present embodiment. The terminal apparatus and the base station apparatus, for example, include a processor 501, ROM 502, RAM 503, a storage apparatus 504, and a communication circuit 505. In the terminal apparatus, for example, a program for implementing the functions of the terminal apparatus described above, for example, stored in the ROM 502, the RAM 503, or the storage apparatus 504 is executed by the processor 501. In a similar manner, in the base station apparatus, a program for implementing the functions of the base station apparatus described above, for example, stored in the ROM 502, the RAM 503, or the storage apparatus 504 is executed by the processor 501. Note that the processor 501 may be one or more processors including a central processing unit (CPU), an application specific integrated circuit (ASIC), a field-programmable gate array (FPGA), a digital signal processor (DSP), and the like.

The terminal apparatus and the base station apparatus control the communication circuit 505 via the processor 501, for example, and communicate with the partner apparatus (for example, in the case of the terminal apparatus, the base station apparatus, and in the case of the base station apparatus, the terminal apparatus or a network node). Note that in FIG. 5, the terminal apparatus and the base station apparatus are schematically illustrated including a single communication circuit 505. However, no such limitation is intended. For example, the terminal apparatus may include a communication circuit for communication with the base station apparatus and a communication circuit for communication with a wireless LAN or the like. Also, for example, the base station apparatus may include a communication circuit for communication with the terminal apparatus and a communication circuit for communication with a network node.

Note that the terminal apparatus and the base station apparatus may be provided with dedicated hardware for executing the functions. Alternatively, a portion of the functions may be executed by the hardware and the other portion may be executed by a computer running a program. Also, all functions may be executed by a computer and a program.

Figure 6:
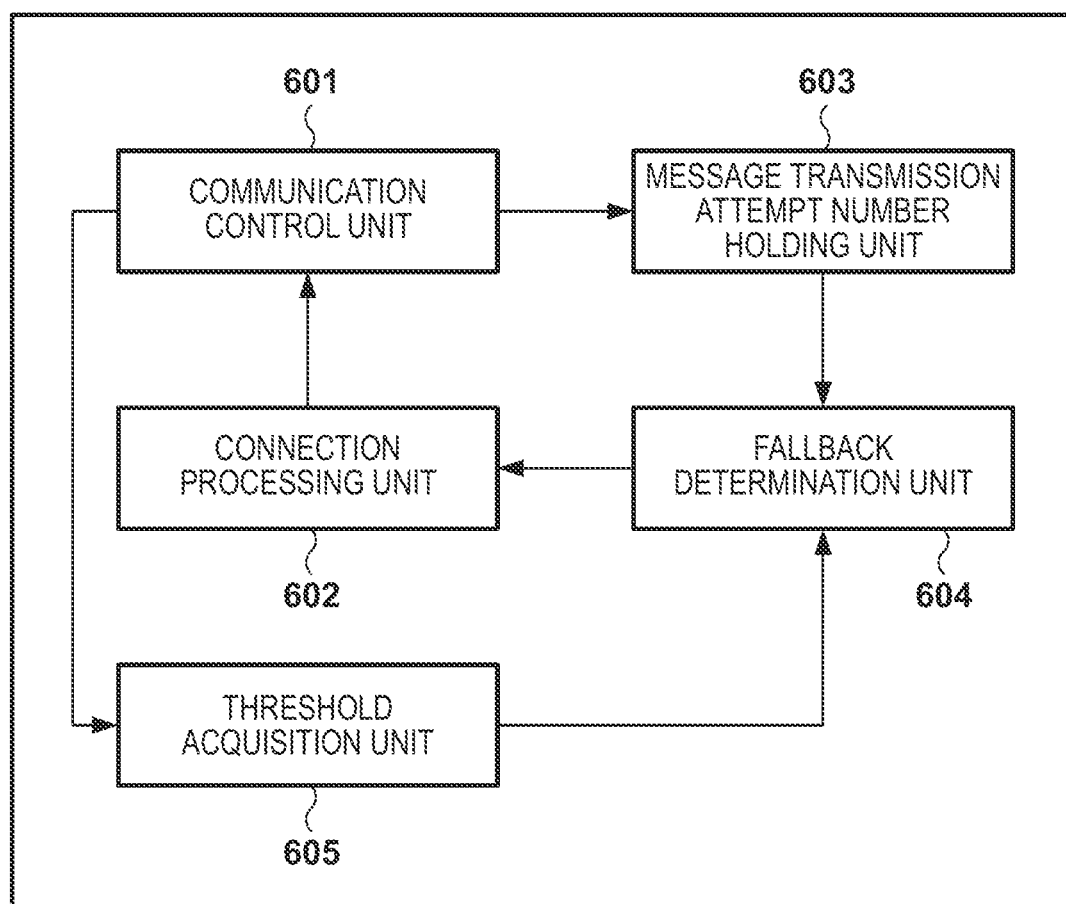
FIG. 6 is a diagram illustrating an example of the functional configuration of the terminal apparatus.

FIG. 6 is a diagram illustrating an example of the functional configuration of the terminal apparatus according to the present embodiment. The terminal apparatus includes, as functions, a communication control unit 601, a connection processing unit 602, a message transmission attempt number holding unit 603, a fallback determination unit 604, and a threshold acquisition unit 605. Note that the terminal apparatus may of course also function as a typical terminal apparatus, and these functions have been omitted to simplify the description.

The communication control unit 601 controls the communication (wireless communication compliant with 5G communication standards, for example) performed between the terminal apparatus and the base station apparatus. The communication control unit 601, for example, executes various types of control to execute communication with the base station apparatus. The communication control unit 601, for example, executes various types of control for wireless communication compliant with 5G standards. The connection processing unit 602 executes two-step RACH or four-step RACH via the communication control unit 601 to establish connection with the base station apparatus. The two-step RACH or four-step RACH fallback processing may be executed by the connection processing unit 602, for example. The message transmission attempt number holding unit 603 holds the number of times the message A has been transmitted via the communication control unit 601. The message transmission attempt number holding unit 603, for example, resets the attempt number to 0 when the two-step RACH connection processing starts and counts the number of times the message A has been transmitted in the time until the message B is received from the base station apparatus. The fallback determination unit 604 determines whether or not the number of message A transmission attempts held by the message transmission attempt number holding unit 603 has reached a predetermined number and, in a case where the number of transmission attempts has reached the predetermined number, determines to perform fallback to four-step RACH. The fallback determination unit 604 inputs the determination result to the connection processing unit 602, and the connection processing unit 602 starts four-step RACH connection processing in response to a determination result of perform fallback to four-step RACH being acquired. In other words, in response to acquiring a determination result of perform fallback to four-step RACH, the connection processing unit 602 transmits a four-step RACH random access preamble (message 1) to the base station apparatus. Then, connection processing is executed in accordance with four-step RACH processing.

The threshold acquisition unit 605 acquires, from the base station apparatus via the communication control unit 601, information of the predetermined number used in determining whether or not to perform fallback to four-step RACH as described above. The predetermined number, for example, may be the maximum number of transmission attempts of a random access preamble via a four-step RACH. In the four-step RACH, in a case where the terminal apparatus has not received a random access response from the base station apparatus even after the maximum number of transmission attempts of the random access preamble, random access is determined to have failed. Using information of the maximum number of transmission attempts of a random access preamble in a known four-step RACH removes the need to change the operation of the base station apparatus relating to notification of the predetermined number from that of a typical configuration. The maximum number of transmission attempts of a random access preamble in a four-step RACH is reported from the base station apparatus via a broadcast signal to a plurality of terminal apparatuses at the same time, for example. Note that the predetermined number may be reported to the terminal apparatus via individual signaling. Also, the predetermined number may be a value different from the maximum number of transmission attempts of a random access preamble. For example, the predetermined number may be specified as a value less than the maximum number of transmission attempts of a random access preamble. In this case as well, the predetermined number may be reported via a broadcast signal to one or more terminal apparatuses at the same time or may be individually reported to each terminal apparatus via individual signaling. Note that the predetermined number may be set in advance, and in this case, the threshold acquisition unit 605 may be omitted.

The terminal apparatus, for example, attempts to establish a connection with the base station apparatus by transmitting the two-step RACH message A until the predetermined number obtained by the threshold acquisition unit 605 is reached. In a case where the terminal apparatus receives the message B before the number of message A transmission attempts reaches the predetermined number, a connection with the base station apparatus can be established via the following two-step RACH connection processing. However, in a case where the number of message A transmission attempts by the terminal apparatus without the message B being received reaches the predetermined number, the two-step RACH processing ends and four-step RACH processing starts. In this case, the terminal apparatus transmits a four-step RACH random access preamble (message 1) and attempts to connect with the base station apparatus. Note that in a case where the terminal apparatus does not receive the message 2 after transmitting the message 1, the message 1 is resent. This resending is performed until the number of resend attempts reaches the maximum number of transmission attempts of a random access preamble via four-step RACH is reached, for example. In this manner, the probability of successfully establishing a connection via four-step RACH can be increased. Note that in a case where the predetermined number (defined as "m") described above is a number less than the maximum number of transmission attempts (defined as "n") of the four-step RACH random access preamble, the message 1 may be resent until the attempt number reaches (n-m). In this case, the sum of the transmission attempt number of two-step RACH message A and the transmission attempt number of four-step RACH message 1 can be kept to a value equal to or less than the maximum number of transmission attempts of the four-step RACH message 1. Thus, even in a case where fallback is performed from two-step RACH processing to four-step RACH processing, the time taken to establish a connection can be prevented from increasing moreso than in a case where only four-step RACH is used.

Note that the predetermined number described above may be set for each bandwidth part set for the terminal apparatus. In this case, the threshold acquisition unit 605 may acquire a predetermined number for each bandwidth part set for the terminal apparatus. Note that in a case where the maximum number of transmission attempts of a four-step RACH random access preamble is set for each bandwidth part, this number may be used as the predetermined number, or a different number may be used as the predetermined number. The terminal apparatus transmits the message A via one (active) bandwidth part of the bandwidth part set for the terminal apparatus. Then, in a case where the message A transmission attempt number reaches the predetermined number for that bandwidth part without the message B being received from the base station apparatus, fallback to four-step RACH is performed. Note that the base station apparatus may report the predetermined number for each bandwidth part to one or more terminal apparatuses via a broadcast signal, or may report the predetermined number individually to each terminal apparatus via individual signaling.

Note that in the items of processing described above, in relationship to the base station apparatus notifying the terminal apparatus of the four-step RACH maximum number of transmission attempts, because each type of predetermined number can be reported, a known configuration can be used. Thus, an example of the functional configuration of the base station apparatus is omitted from this description.

Processing Flow

Figure 9:
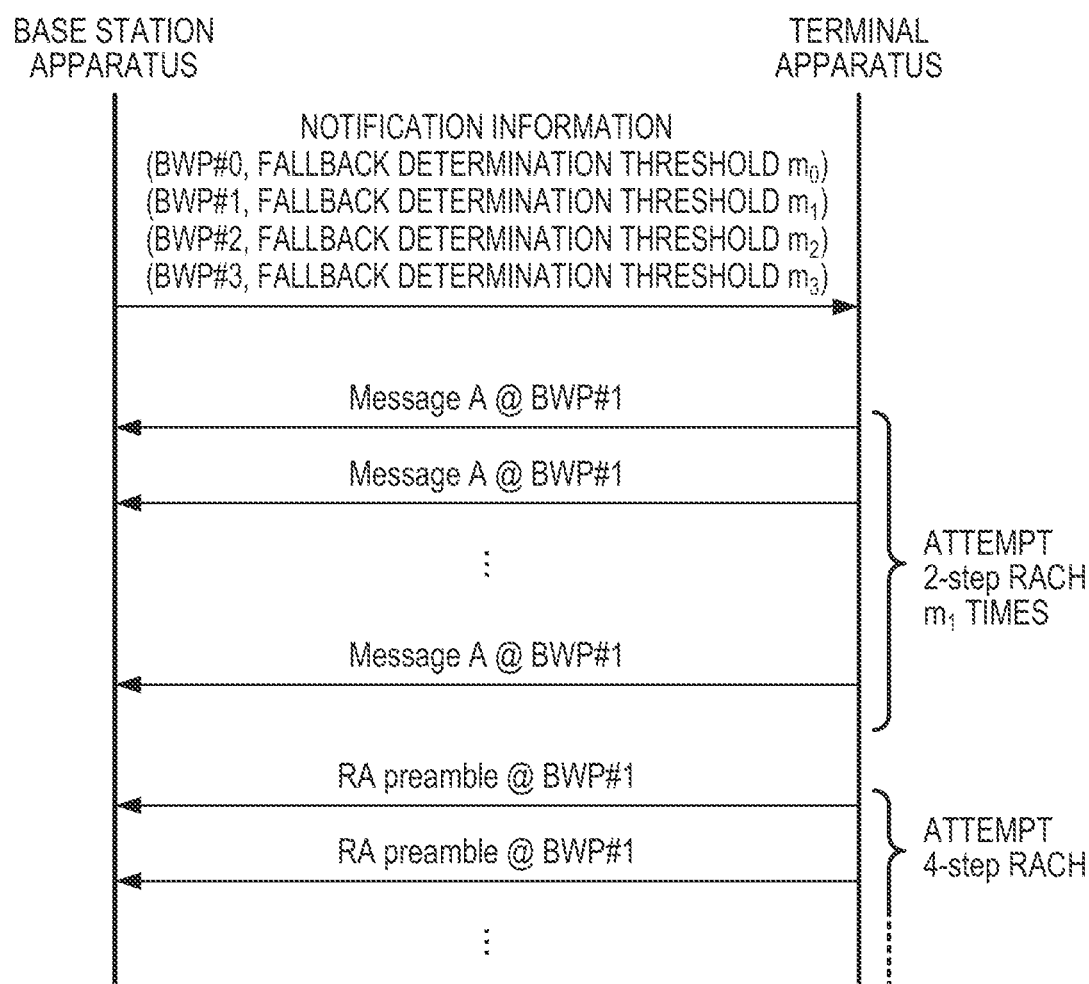
FIG. 9 is a diagram illustrating an example of the flow of the processing executed by the wireless communication system.

Next, examples of the processing flow according to the present embodiment will be described using FIGS. 7 to 9. FIG. 7 is a diagram illustrating an example of processing in a case where the maximum number of transmission attempts of a random access preamble of a four-step RACH is used as the predetermined number described above. FIG. 8 is a diagram illustrating an example of processing in a case where a number different from the maximum number of transmission attempts of a random access preamble of a four-step RACH is used as the predetermined number described above. Also, FIG. 9 is a diagram illustrating a case where the predetermined number is set for each bandwidth part.

In the example illustrated in FIG. 7, the terminal apparatus acquires the information of the maximum number of transmission attempts (n) of a random access preamble of a four-step RACH, as the information of the predetermined number, from a broadcast signal transmitted from the base station apparatus, for example. Also, in the example illustrated in FIG. 8, the terminal apparatus acquires the information of the threshold (m) which is a number different from the maximum number of transmission attempts (n) of a random access preamble of a four-step RACH, as the information of the predetermined number, from a broadcast signal transmitted from the base station apparatus, for example. Note that the terminal apparatus may acquire the information of the number threshold (m) via individual signaling from another base station apparatus via connection processing upon location registration, for example. Note that in FIG. 8, the threshold that is different from the maximum number of transmission attempts of a random access preamble is represented by a fallback threshold. In the example illustrated in FIG. 9, the fallback threshold for each bandwidth part is set, and the value corresponding to the information of the predetermined number for each bandwidth part is reported from the base station apparatus to the terminal apparatus. Note that the maximum number of transmission attempts of a random access preamble may be set for each bandwidth part, and in the example of FIG. 9, the maximum number of transmission attempts of a random access preamble for each bandwidth part may be reported from the base station apparatus to the terminal apparatus as information of the predetermined number for each bandwidth part. Note that the predetermined number may be set for the terminal apparatus in advance at times such as when the terminal apparatus is manufactured when the wireless communication system is setup, or the like, and in this case, the information of the predetermined number may not be reported from the base station apparatus to the terminal apparatus.

When two-step RACH starts, the terminal apparatus resets the message A transmission attempt number to 0, and each time the message A is transmitted, the terminal apparatus counts up the transmission attempt number and stores this value. The terminal apparatus, for example, transmits the message A so that the preamble portion of the message A is transmitted via a random access preamble transmission opportunity (frequency and time resources for transmitting a random access preamble). Then, the terminal apparatus, after transmitting the message A, waits for the message B, which is a reply to the message A, to be transmitted from the base station apparatus. In a case where the terminal apparatus has not received the message B, the message A is resent so that the preamble portion is transmitted via the next random access preamble transmission opportunity. The terminal apparatus counts up the value of the number of transmission attempts each time the message A is resent, and determines whether the value has reached the predetermined number each time it counts up. Then, in a case where the value of the number of transmission attempts has reached the predetermined number, the terminal apparatus ends transmission of the message A and then changes the processing for connecting to the base station apparatus to a four-step RACH random access operation. When the terminal apparatus starts the four-step RACH random access operation, the terminal apparatus transmits the message 1 (random access preamble) of the four-step RACH and then waits for the message 2 (random access response) of the four-step RACH to arrive from the base station apparatus. After the terminal apparatus receives the message 2, the message 3 and message 4 of the four-step RACH are transmitted and received between the terminal apparatus and the base station apparatus and a connection between the terminal apparatus and the base station apparatus is established.

In the example of FIG. 7, in a case where the terminal apparatus has not received the message B in response to the transmitted message A, the terminal apparatus repeatedly resends the message A until the number of transmission attempts of the message A equals the maximum number of transmission attempts (n) of the random access preamble. In other words, the terminal apparatus resends the message A a maximum of n times. Then, in response to the message A having been transmitted n number of times, the terminal apparatus ends the transmission of the message A and, in a case where at this point in time a connection with the base station apparatus is not established, starts four-step RACH. In a similar manner, in the example of FIG. 8, in a case where the terminal apparatus has not received the message B in response to the transmitted message A, the terminal apparatus repeatedly resends the message A until the number of transmission attempts of the message A equals the fallback determination threshold (m). In other words, the terminal apparatus resends the message A a maximum of m times. Then, in response to the message A having been transmitted m number of times, the terminal apparatus ends the transmission of the message A and, in a case where at this point in time a connection with the base station apparatus is not established, starts four-step RACH. In the example of FIG. 9, the fallback threshold differs depending on which bandwidth part the terminal apparatus uses. Let us say that in the example of FIG. 9, the terminal apparatus transmits the message A using a first bandwidth part (BWP #1). In this example, in a case where the terminal apparatus has not received the message B in response to the transmitted message A, the terminal apparatus repeatedly resends the message A until the number of transmission attempts of the message A equals the fallback determination threshold ($m_1$) for the first bandwidth part. Note that the terminal apparatus does not use the fallback determination thresholds ($m_0$, $m_2$, $m_3$) for the bandwidth parts (BWP #0, BWP #2, BWP #3) that are not used by the terminal apparatus to transmit the message A in determining the fallback to four-step RACH. In response to the message A having been transmitted $m_1$ number of times via the first bandwidth part, the terminal apparatus ends the transmission of the message A and, in a case where at this point in time a connection with the base station apparatus is not established, starts four-step RACH. For example, the terminal apparatus starts transmission of a random access preamble via the first bandwidth part.

Note that in the processing described above, the number of transmission attempts of the message A may be reset to one when the two-step RACH starts, for example, and in this case, the terminal apparatus stops the two-step RACH when the number of transmission attempts of the message A exceeds the predetermined number. In other words, after the first transmission of the message A, the number of transmission attempts is counted up to 2. As a result, in the example of FIG. 7 for example, when the message A has been transmitted n number of times, the number of transmission attempts is equal to n+1 and thus exceeds the predetermined number. Accordingly, in a case where the terminal apparatus counts up from the number of transmission attempts of the message A reset to 1, the two-step RACH ends in response to the number of transmission attempts exceeds the predetermined number, allowing similar processing to be executed as the processing described above. Furthermore, the value of the number of transmission attempts of the message A may be reset to a predetermined number, and the value of the number of transmission attempts may be counted up after each transmission of the message A. In this manner, we can understand that the examples described above are examples, and various configurations may be used to end the two-step RACH when the message A has been transmitted a predetermined number of times.

According to the present embodiment, the maximum number of transmission attempts of the message A is set and, in a case where the terminal apparatus cannot establish a connection with the base station apparatus via two-step RACH, four-step RACH is executed. In this manner, the probability of the terminal apparatus successfully establishing a connection with the base station apparatus can be enhanced. Also, because the terminal apparatus initially uses the two-step RACH, in a case where the communication environment is good, a connection with the base station apparatus can be quickly established.

Second Embodiment

In the present embodiment, the terminal apparatus ends two-step RACH in response to the elapsed time from transmission of the message A via two-step RACH reaching a predetermined time and starts connection processing via four-step RACH.

Apparatus Configuration

Figure 10:
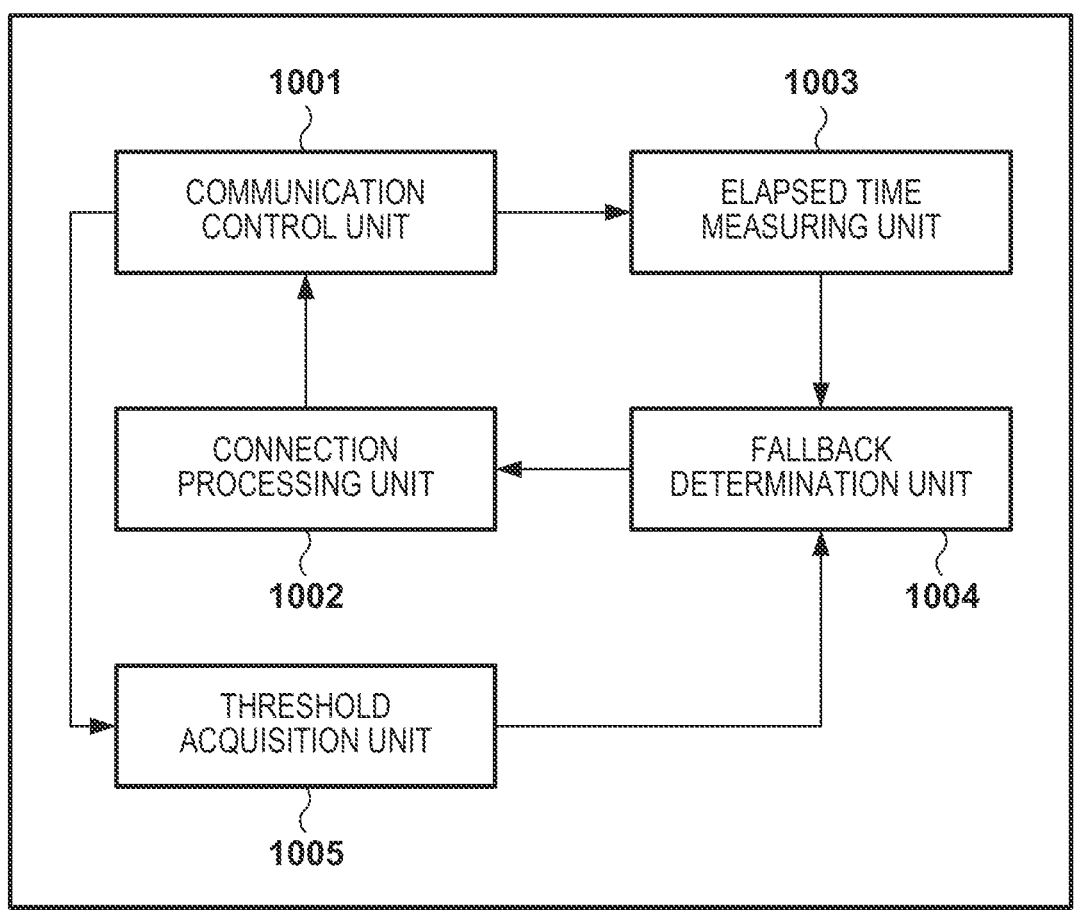
FIG. 10 is a diagram illustrating an example of the functional configuration of the terminal apparatus.

FIG. 10 is a diagram illustrating an example of the functional configuration of the terminal apparatus according to the present embodiment. Note that the example of the hardware configuration is similar to that illustrated in FIG. 5, and thus the description thereof is omitted. The terminal apparatus includes, as functions, a communication control unit 1001, a connection processing unit 1002, an elapsed time measuring unit 1003, a fallback determination unit 1004, and a threshold acquisition unit 1005. Note that the terminal apparatus may of course also function as a typical terminal apparatus, and these functions have been omitted to simplify the description.

The communication control unit 1001 and the connection processing unit 1002 are similar to the communication control unit 601 and the connection processing unit 602 described above. The elapsed time measuring unit 1003 holds the elapsed time from the transmission of the message A via the communication control unit 1001. The elapsed time measuring unit 1003, for example, resets the timer to 0 when two-step RACH starts, holds the timer which starts in response to the message A being transmitted, and updates the timer with the time elapsed while the message B has not been received from the base station apparatus. The fallback determination unit 1004 determines whether or not the elapsed time from transmission of the message A held by the elapsed time measuring unit 1003 has reaches a predetermined amount of time and, in a case where the elapsed time has reached the predetermined amount time, determines to perform fallback to four-step RACH. The fallback determination unit 1004 inputs the determination result to the connection processing unit 1002, and the connection processing unit 1002 starts four-step RACH connection processing in response to a determination result of perform fallback to four-step RACH being acquired. In other words, in response to acquiring a determination result of perform fallback to four-step RACH, the connection processing unit 1002 transmits a four-step RACH random access preamble (message 1) to the base station apparatus. Then, connection processing is executed in accordance with four-step RACH processing.

The threshold acquisition unit 1005 acquires, from the base station apparatus via the communication control unit 1001, information of the predetermined amount of time used in determining whether or not to perform fallback to four-step RACH as described above. The predetermined amount of time may be, for example, specified by the timer used in four-step RACH. Four-step RACH has two timers, ra-ResponseWindow and ra-ContentionResolutionTimer. ra-ResponseWindow is used to determine that the random access preamble has not reached the base station apparatus in a case where the amount of time specified by the ra-ResponseWindow has elapsed without the terminal apparatus receiving a random access response to the transmitted random access preamble. Also, ra-ContentionResolutionTimer is used to determine that random access (contention resolution) has failed in a case where the amount of time specified by the ra-ContentionResolutionTimer has elapsed without the terminal apparatus receiving the message 4 after transmission of the message 3 in response to receiving the random access response. Also, the terminal apparatus may use ra-ResponseWindow or ra-ContentionResolutionTimer as the predetermined amount of time according to the present embodiment. Accordingly, because the timer value in a known four-step RACH can be used, this removes the need to change the operation of the base station apparatus relating to notification of the predetermined amount of time from that of a typical configuration. The four-step RACH timer values may be reported from the base station apparatus via a broadcast signal to a plurality of terminal apparatuses at the same time, for example. Note that the predetermined amount of time may be reported to the terminal apparatus via individual signaling. Also, the predetermined amount of time may be a value different from the four-step RACH timer described above. For example, the predetermined amount of time may be specified as a value less than the four-step RACH timer described above. Furthermore, the predetermined amount of time may be specified as a value greater than the four-step RACH timer described above. In this case as well, the predetermined amount of time may be reported via a broadcast signal to one or more terminal apparatuses at the same time or may be individually reported to each terminal apparatus via individual signaling. Note that the predetermined amount of time may be set in advance, and in this case, the threshold acquisition unit 1005 may be omitted.

After transmission of the message A, for example, the terminal apparatus waits until the time reaches the predetermined amount of time acquired by the threshold acquisition unit 1005 and waits to receive the message B from the base station apparatus within the predetermined amount of time. In this manner the terminal apparatus attempts to establish a connection with the base station apparatus. In a case where the terminal apparatus receives the message B before the elapsed time from the transmission of the message A reaches the predetermined amount of time, a connection with the base station apparatus can be established via the following two-step RACH connection processing. However, in a case where the elapsed time from the transmission of the message A by the terminal apparatus without the message B being received reaches the predetermined amount of time, the two-step RACH processing ends and four-step RACH processing starts. In this case, the terminal apparatus transmits a four-step RACH random access preamble (message 1) and attempts to connect with the base station apparatus.

Note that the predetermined amount of time described above may be set for each bandwidth part set for the terminal apparatus. In this case, the threshold acquisition unit 1005 may acquire a predetermined amount of time for each bandwidth part set for the terminal apparatus. Note that in a case where the timer value described above of four-step RACH is individually set for each bandwidth part, this timer value may be used as the predetermined amount of time, or a different value may be used as the predetermined amount of time. The terminal apparatus transmits the message A via one (active) bandwidth part of the bandwidth part set for the terminal apparatus. Then, in a case where the elapsed time from the transmission of the message A reaches the predetermined amount of time for that bandwidth part without the message B being received from the base station apparatus, fallback to four-step RACH is performed. Note that the base station apparatus may report the predetermined amount of time for each bandwidth part to one or more terminal apparatuses via a broadcast signal, or may report the predetermined amount of time individually to each terminal apparatus via individual signaling.

The predetermined amount of time may be related to the amount of time from the first transmission of the message A, for example. In other words, the terminal apparatus may measure the elapsed time from the first transmission of the message A and may repeatedly transmit the message A until the elapsed time reaches the predetermined amount of time. In this case, when the message A is transmitted for the second time and other times onward, the terminal apparatus may not clear the value of the elapsed time held in the elapsed time measuring unit 1003. Also, in a case where the message A is repeatedly transmitted only a predetermined number of times as in the first embodiment described above, the predetermined amount of time may be related to the amount of time from the final transmission of the message A, for example. In this case, when the predetermined amount of time is greater than the transmission period of the message A, for example, the terminal apparatus may clear the value of the elapsed time held in the elapsed time measuring unit 1003 each time the message A is transmitted and measure the amount of time from each transmission of the message A.

Note that in the items of processing described above, in relationship to the base station apparatus notifying the terminal apparatus of each timer of the four-step RACH, because each type of predetermined amount of time can be reported, a known configuration can be used. Thus, an example of the functional configuration of the base station apparatus is omitted from this description.

Processing Flow

Figure 11:
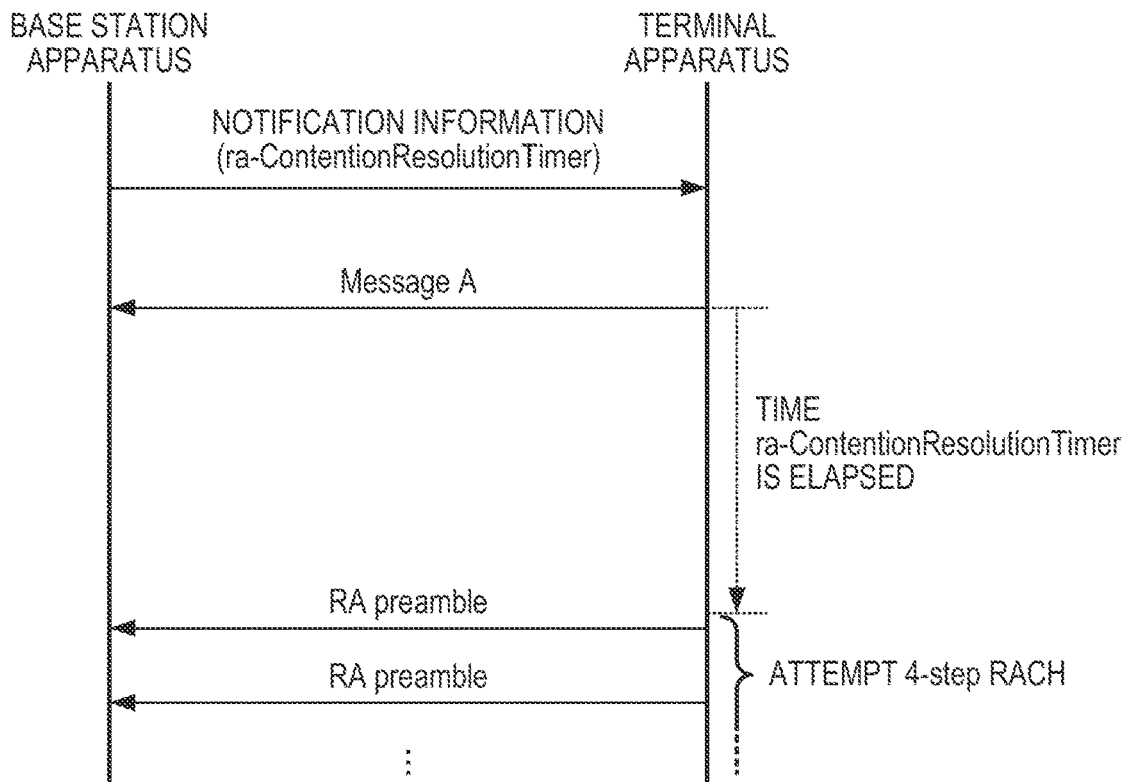
FIG. 11 is a diagram illustrating an example of the flow of the processing executed by the wireless communication system.
Figure 12:
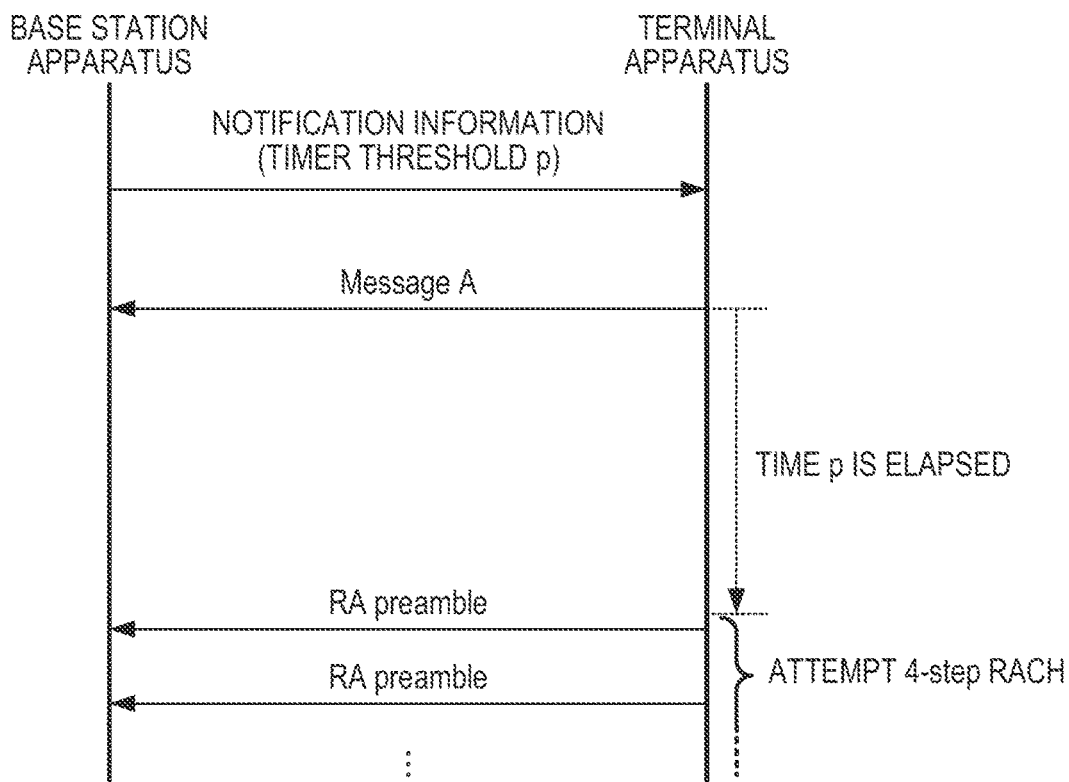
FIG. 12 is a diagram illustrating an example of the flow of the processing executed by the wireless communication system.
Figure 13:
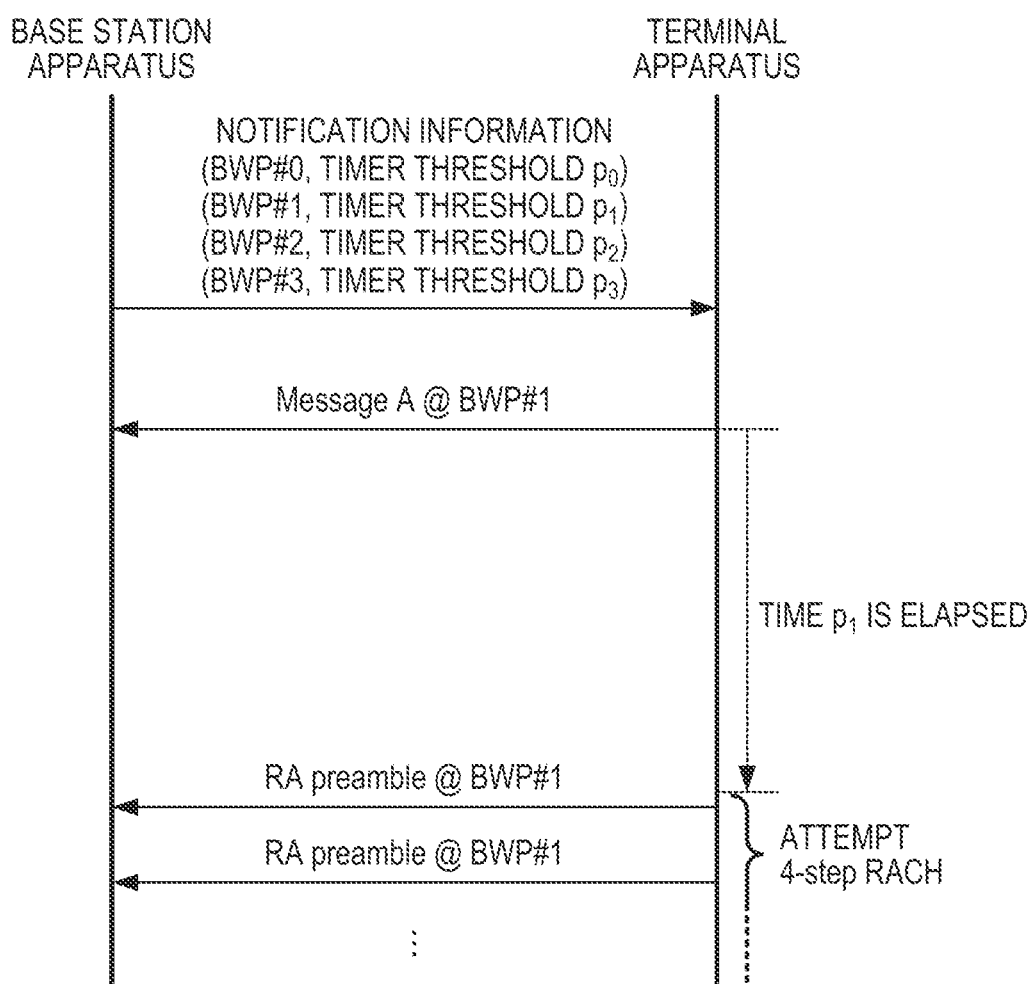
FIG. 13 is a diagram illustrating an example of the flow of the processing executed by the wireless communication system.

Next, examples of the processing flow according to the present embodiment will be described using FIGS. 11 to 13. FIG. 11 is a diagram illustrating an example of the processing executed in a case where a timer value (ra-ContentionResolutionTimer) used in four-step RACH is used as the predetermined amount of time described above. Also, FIG. 12 is a diagram illustrating an example of the processing in a case where a value different from the timer value used in four-step RACH is used as the predetermined amount of time described above. Also, FIG. 13 is a diagram illustrating a case where the predetermined amount of time is set for each bandwidth part.

In the example of FIG. 11, the terminal apparatus acquires the information of the timer value (in this example, ra-ContentionResolutionTimer is used, but ra-ResponseWindow may also be used) used in four-step RACH as the information of the predetermined amount of time from a broadcast signal transmitted from the base station apparatus, for example. Also, in the example illustrated in FIG. 12, the terminal apparatus acquires the information of a threshold (p) which is an amount of time different from the timer value used in four-step RACH, as the information of the predetermined amount of time, from a broadcast signal transmitted from the base station apparatus, for example. Note that the terminal apparatus may acquire the information of the amount of time threshold (p) via individual signaling from another base station apparatus via connection processing upon location registration, for example. Note that in FIG. 12, the amount of time threshold different from the timer value used in four-step RACH is represented as a timer threshold. In the example illustrated in FIG. 13, the timer threshold for each bandwidth part is set, and the value corresponding to the information of the predetermined amount of time for each bandwidth part is reported from the base station apparatus to the terminal apparatus. Note that the timer value used in four-step RACH may be set for each bandwidth part, and in the example of FIG. 13, the timer value used in four-step RACH for each bandwidth part may be reported from the base station apparatus to the terminal apparatus as information of the predetermined amount of time for each bandwidth part. Note that the predetermined amount of time may be set for the terminal apparatus in advance at times such as when the terminal apparatus is manufactured when the wireless communication system is setup, or the like, and in this case, the information of the predetermined amount of time may not be reported from the base station apparatus to the terminal apparatus.

The terminal apparatus activates the timer starting from 0 when the message A is transmitted and updates this value as time elapses. The terminal apparatus, for example, transmits the message A so that the preamble portion of the message A is transmitted via a random access preamble transmission opportunity (frequency and time resources for transmitting a random access preamble). Then, the terminal apparatus, after transmitting the message A, waits for the message B, which is a reply to the message A, to be transmitted from the base station apparatus. Here, the terminal apparatus determines whether the time elapsed without receiving the message B has reached the predetermined amount of time. Then, in a case where the elapsed time (timer value) has reached the predetermined amount of time, the terminal apparatus ends two-step RACH and then changes the processing for connecting to the base station apparatus to a four-step RACH random access operation. When the terminal apparatus starts the four-step RACH random access operation, the terminal apparatus transmits the message 1 (random access preamble) of the four-step RACH and then waits for the message 2 (random access response) of the four-step RACH to arrive from the base station apparatus. After the terminal apparatus receives the message 2, the message 3 and message 4 of the four-step RACH are transmitted and received between the terminal apparatus and the base station apparatus and a connection between the terminal apparatus and the base station apparatus is established.

In the example of FIG. 11, in a case where, after the transmission of the message A, the elapsed time without the terminal apparatus receiving the message B reaches (or exceeds) the amount of time indicated by ra-ContentionResolutionTimer, the two-step RACH processing ends and four-step RACH starts. In a similar manner, in the example of FIG. 12, in a case where, after the transmission of the message A, the elapsed time without the terminal apparatus receiving the message B reaches (or exceeds) the amount of time indicated by the timer threshold (p), the two-step RACH processing ends and four-step RACH starts. In the example of FIG. 13, the timer threshold differs depending on which bandwidth part the terminal apparatus uses. Let us say that in the example of FIG. 13, the terminal apparatus transmits the message A using a first bandwidth part (BWP #1). In this example, in a case where, after the transmission of the transmitted message A, the elapsed time without the terminal apparatus receiving the message B reaches (or exceeds) the timer threshold ($p_1$), the two-step RACH processing ends and four-step RACH starts. Note that the terminal apparatus does not use the timer thresholds ($p_0$, $p_2$, $p_3$) for the bandwidth parts (BWP #0, BWP #2, BWP #3) that are not used by the terminal apparatus to transmit the message A in determining the fallback to four-step RACH. In a case where the message A is the first bandwidth part, the terminal apparatus starts transmission of a random access preamble via the first bandwidth part in response to the start of four-step RACH.

According to the present embodiment, a threshold is provided for ending two-step RACH when the elapsed time without the message B being received, after transmission of the message A, reaches a certain value. Using this threshold, four-step RACH is executed in a case where the terminal apparatus cannot establish a connection with the base station apparatus via two-step RACH for a certain amount of time. Thus, the probability of the terminal apparatus successfully establishing a connection with the base station apparatus can be enhanced, and the time taken until a connection is established can be prevented from being unnecessarily increased. Also, because the terminal apparatus initially uses the two-step RACH, in a case where the communication environment is good, a connection with the base station apparatus can be quickly established.

Third Embodiment

In the present embodiment, in a case where the base station apparatus succeeds in detecting a preamble included in the message A but is unsuccessful in demodulating the PUSCH portion thereafter, the base station apparatus instructs the terminal apparatus to execute four-step RACH. In this manner, in a wireless environment such that the base station apparatus can detect the preamble portion but cannot receive the PUSCH information, the terminal apparatus can cause four-step RACH to be executed. At this time, the base station apparatus transmits the instruct described above via the message B as well as transmitting information corresponding to the message 2 of four-step RACH to the terminal apparatus. Accordingly, the terminal apparatus can start the four-step RACH processing from the message 3. This allows the time taken to establish a connection via four-step RACH to be reduced by using a portion of the two-step RACH result.

Apparatus Configuration

Figure 14:
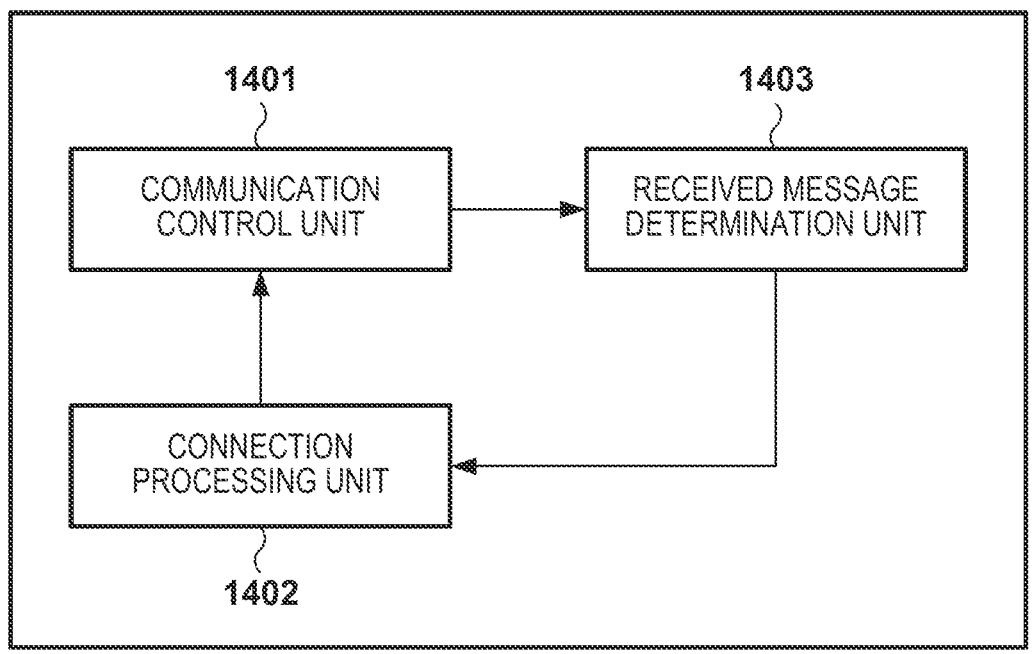
FIG. 14 is a diagram illustrating an example of the functional configuration of the terminal apparatus.
Figure 15:
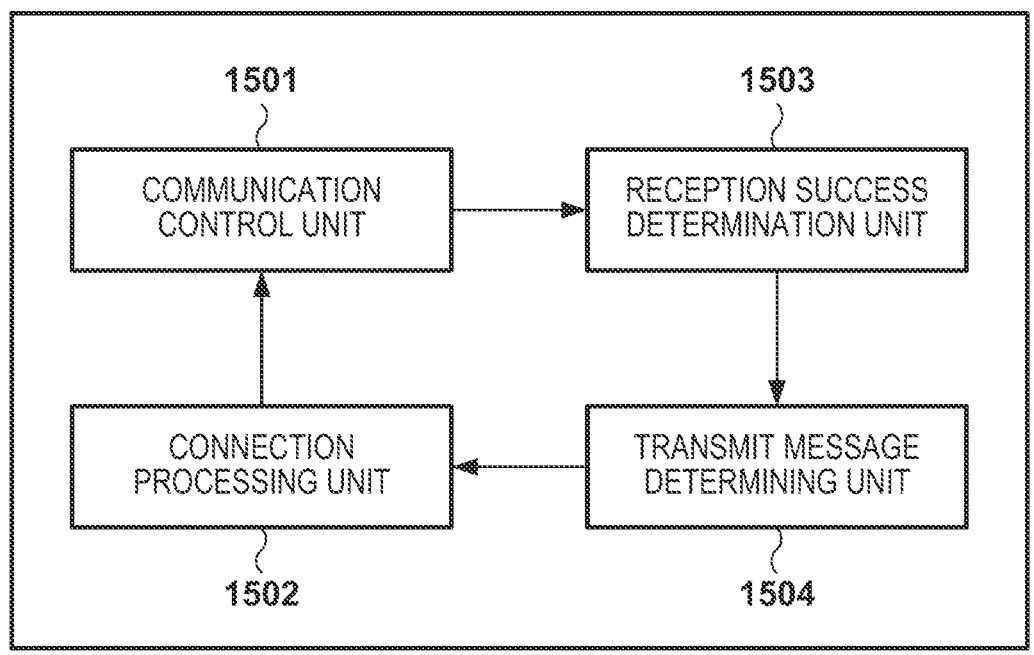
FIG. 15 is a diagram illustrating an example of the functional configuration of a base station apparatus.

FIG. 14 is a diagram illustrating an example of the functional configuration of the terminal apparatus according to the present embodiment. Also, FIG. 15 is a diagram illustrating an example of the functional configuration of the base station apparatus according to the present embodiment. Note that the example of the hardware configuration of the terminal apparatus and the base station apparatus is similar to that illustrated in FIG. 5, and thus the description thereof is omitted.

The terminal apparatus includes, as functions, a communication control unit 1401, a connection processing unit 1402, and a received message determination unit 1403. Note that the terminal apparatus may of course also function as a typical terminal apparatus, and these functions have been omitted to simplify the description. The base station apparatus includes a communication control unit 1501, a connection processing unit 1502, a reception success determination unit 1503, and a transmit message determining unit 1504. Note that the base station apparatus may of course also function as a typical base station apparatus, and these functions have been omitted to simplify the description.

The communication control unit 1401 of the terminal apparatus is similar to the communication control unit 601 described above. The connection processing unit 1402 is similar to the connection processing unit 602 described above in that it uses two-step RACH and/or four-step RACH to establish a connection with the base station apparatus. However, in the present embodiment, in a case where, on the basis of the message received from the base station apparatus, the preamble portion of the message A is successfully received by the base station apparatus but the PUSCH portion is not successfully received, the connection processing unit 1402 ends two-step RACH and starts four-step RACH. The received message determination unit 1403 determines whether or not to switch from two-step RACH to four-step RACH on the basis of the message received from the base station apparatus.

The communication control unit 1501 of the base station apparatus controls the communication (wireless communication compliant with 5G communication standards, for example) performed between the base station apparatus and the terminal apparatus. The communication control unit 1501, for example, executes various types of control to execute communication with the terminal apparatus. The communication control unit 1501, for example, executes various types of control for wireless communication compliant with 5G standards. The connection processing unit 1502 executes the two-step RACH or four-step RACH started by the terminal apparatus via the communication control unit 1501 to establish connection with the terminal apparatus. For example, the connection processing unit 1502 executes control for establishing a connection with the terminal apparatus by transmitting a reply message in response to a message for the random access procedure received via the communication control unit 1501. Note that the contents of the reply message are determined by the transmit message determining unit 1504. The reception success determination unit 1503 determines whether or not the message from the terminal apparatus has been successfully received. For example, the reception success determination unit 1503 determines whether or not the two-step RACH message A has been successfully received, whether or not only the preamble portion of the message A has been successfully received, or whether or not the preamble portion and the PUSCH portion have been successfully received.

The transmit message determining unit 1504 determines the message to transmit to the terminal apparatus via the connection processing unit 1502 on the basis of the determination result from the reception success determination unit 1503. For example, in a case where the reception success determination unit 1503 determines that the preamble portion and the PUSCH portion of the message A has been successfully received, the transmit message determining unit 1504 determines to transmit the message B without a fallback instruction. Also, in a case where the reception success determination unit 1503 determines that the preamble portion of the message A has been successfully received but the PUSCH portion has failed to be received, the transmit message determining unit 1504 determines to transmit the message B with a fallback instruction.

The transmit message determining unit 1504 transmits a message including a PDCCH (physical downlink control channel) portion and a PDSCH (physical downlink shared channel) portion. Here, the message B is transmitted included in PDSCH. At this time, a fallback instruction may be reported to the terminal apparatus by the information elements included in the message B, for example. In this case, by demodulating the message B, the terminal apparatus can determine whether or not there is a fallback instruction. Note that in a case where the reception success determination unit 1503 determines that the preamble portion of the message A has been detected but the PUSCH portion has failed to be received, the transmit message determining unit 1504 may transmit information corresponding to the message 2 of the four-step RACH. The information corresponding to the message 2 includes information of the allocation of the radio resources required to transmit the message 3 via four-step RACH, for example. Accordingly, in a case where the base station apparatus detects the preamble portion of the message A but fails to receive the PUSCH portion, the terminal apparatus can start four-step RACH from the transmission of the message 3.

Also, the fallback instruction may be implicitly reported to the terminal apparatus using information or the like used in scrambling when transmitting PDCCH, for example. Typically, the radio resources used to transmit the random access response (message 2) of the four-step RACH are reported to the terminal apparatus by the PDCCH scrambled with identification information (random access-radio network temporary identifier (RA-RNTI)). At this time, the value of RA-RNTI is determined according to the position of the radio resources used by the random access preamble. In the present embodiment, in a case of no fallback instruction, scrambling of the PDCCH portion is performed using a first RA-RNTI, and in a case of a fallback instruction, scrambling of the PDCCH portion is performed using a second RA-RNTI. Accordingly, the terminal apparatus can determine whether or not a fallback instruction has been issued by determining whether the scrambling of the PDCCH is being performed with the first RA-RNTI or the second RA-RNTI. Note that, in a case where the reception success determination unit 1503 determines that the preamble portion and the PUSCH portion of the message A has been successfully received, the transmit message determining unit 1504 transmits the message B via the PDSCH portion. On the other hand, in a case where the reception success determination unit 1503 determines that the preamble portion of the message A has been detected but the PUSCH portion has failed to be received, the transmit message determining unit 1504 may transmit information corresponding to the message 2 of the four-step RACH via the PDSCH portion. The information corresponding to the message 2 includes information of the allocation of the radio resources required to transmit the message 3 via four-step RACH, for example. In a case where the terminal apparatus executes PDCCH demodulation using the first RA-RNTI and the second RA-RNTI and demodulation using the first RA-RNTI is successful, the terminal apparatus executes message B reception processing, and in a case where demodulation using the second RA-RNTI is successful, the terminal apparatus executes random access response reception processing.

Note that in a case where, as in the first embodiment, the preamble portion is detected a predetermined number of times but the PUSCH portion is not successfully received, the transmit message determining unit 1504 may transmit a message issuing a fallback instruction. Also, in a case where, as in the second embodiment, the PUSCH portion is not successfully received before a predetermined amount of time elapses from the unsuccessful reception of the PUSCH portion with the preamble portion having been detected, the transmit message determining unit 1504 may transmit a message issuing a fallback instruction.

Processing Flow

Next, examples of the processing flow according to the present embodiment will be described using FIGS. 16A, 16B, 17A, and 17B.

Figure 16A:
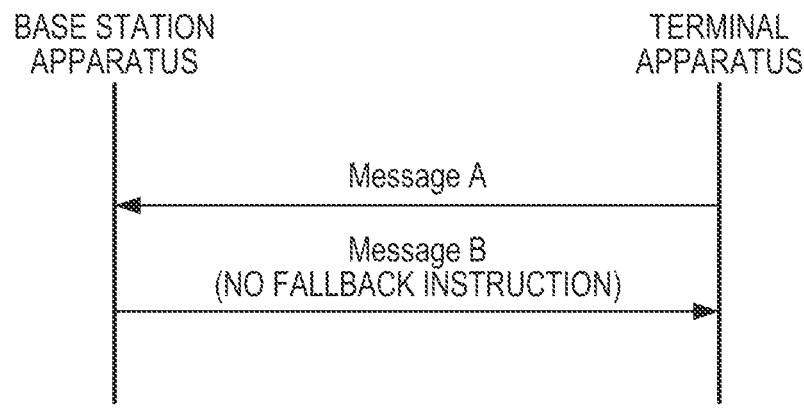
FIG. 16A is a diagram illustrating an example of the flow of the processing executed by the wireless communication system.
Figure 16B:
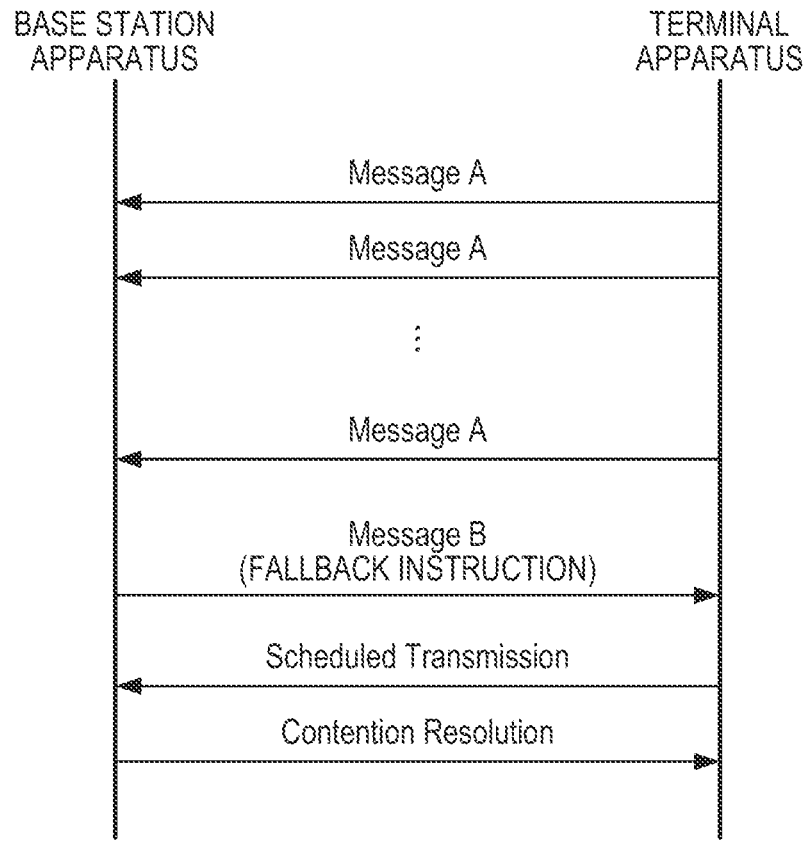
FIG. 16B is a diagram illustrating an example of the flow of the processing executed by the wireless communication system.

FIGS. 16A and 16B are diagrams illustrating examples in which an information element of message B indicates whether or not there is a fallback instruction. FIG. 16A is a diagram illustrating the flow of the processing in a case where the base station apparatus successfully detects the preamble of the message A and demodulates the PUSCH. In this case, the base station apparatus transmits the message B including no fallback instruction to the terminal apparatus. When the terminal apparatus receives the message B, the terminal apparatus can determine the success and the end of two-step RACH. On the other hand, FIG. 16B is a diagram illustrating the flow of the processing in a case where the base station apparatus successfully detects the preamble of the message A but fails to demodulate the PUSCH. Note that in the example of FIG. 16B, in a case where the base station apparatus successfully detects the preamble of the message A a predetermined number of times but is not successful in demodulating the PUSCH, the base station apparatus transmits the message B including a fallback instruction to the terminal apparatus. Note that the predetermined number of times here may be one time, also, in a case where PUSCH demodulation is not successful even after a predetermined amount of time has elapsed from when the preamble detection was successful but the PUSCH demodulation was unsuccessful, the base station apparatus may transmit the message B including a fallback instruction. Note that the base station apparatus manages the number of times PUSCHS demodulation is unsuccessful each preamble and the elapsed time from when the PUSCH demodulation was unsuccessful and determines whether or not to issue a fallback instruction each preamble. The message B here includes the information (information corresponding to the message 2) that specifies the radio resources for transmitting the message 3 of four-step RACH. Accordingly, in a case where the terminal apparatus has received the message B including fallback instructions, the message 3 can be transmitted while omitting the messages 1 and 2 of four-step RACH.

Figure 17A:
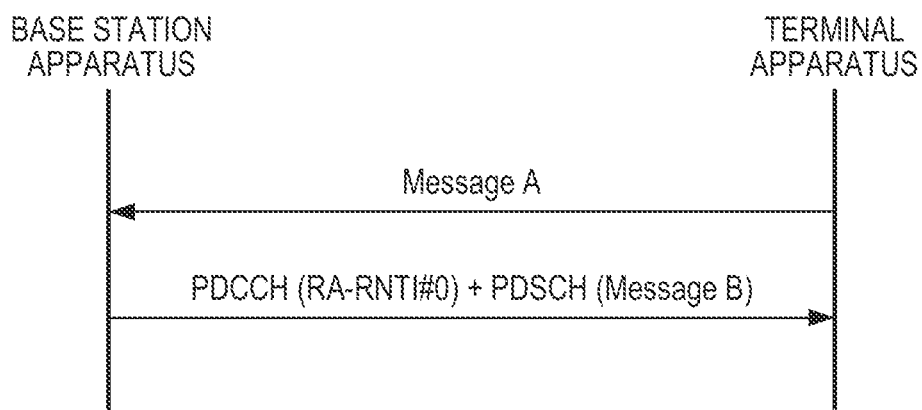
FIG. 17A is a diagram illustrating an example of the flow of the processing executed by the wireless communication system.
Figure 17B:
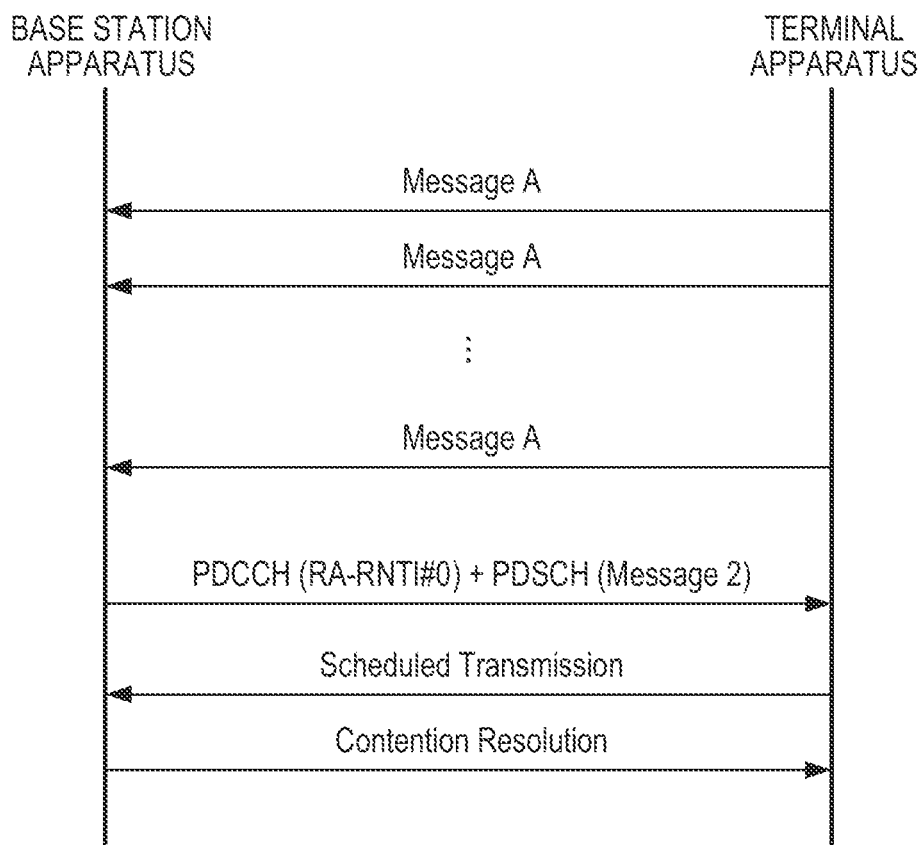
FIG. 17B is a diagram illustrating an example of the flow of the processing executed by the wireless communication system.

FIGS. 17A and 17B are diagrams illustrating examples in which the base station apparatus implicitly reports whether or not there is a fallback instruction to the terminal apparatus via the RA-RNTI used to scramble the PDCCH. FIG. 17A is a diagram illustrating the flow of the processing in a case where the base station apparatus successfully detects the preamble of the message A and demodulates the PUSCH. In this case, the base station apparatus transmits the PDCCH portion scrambled using the first RA-RNTI (RA-RNTI #0) and the PDSCH portion including the message B. The terminal apparatus attempts to demodulate the PDCCH portion via the first RA-RNTI (RA-RNTI #0) and the second RA-RNTI (RA-RNTI #1). In this example, demodulation via the first RA-RNTI is successful, and demodulation via the second RA-RNTI fails. Thus, the terminal apparatus determines that the base station apparatus successfully detected the preamble of the message A and demodulated the PUSCH and, via the following PDSCH, executes message B reception processing. In the example of FIG. 17B, in a case where the base station apparatus successfully detects the preamble of the message A a predetermined number of times but is not successful in demodulating the PUSCH, the base station apparatus transmits the PDCCH portion scrambled using the second RA-RNTI and the PDSCH portion including a random access response. Note that the predetermined number of times here may be one time, also, in a case where PUSCH demodulation is not successful even after a predetermined amount of time has elapsed from when the preamble detection was successful but the PUSCH demodulation was unsuccessful, the base station apparatus may transmit the PDCCH portion scrambled using the second RA-RNTI and the PDSCH portion including a random access response. Note that the base station apparatus manages the number of times PUSCHS demodulation is unsuccessful each preamble and the elapsed time from when the PUSCH demodulation was unsuccessful and determines whether or not to issue a fallback instruction each preamble. The terminal apparatus attempts to demodulate the PDCCH portion via the first RA-RNTI (RA-RNTI #0) and the second RA-RNTI (RA-RNTI #1). In this example, demodulation via the first RA-RNTI fails and demodulation via the second RA-RNTI is successful. Thus, the terminal apparatus determines that the base station apparatus successfully detected the preamble of the message A at predetermined number of times but was unsuccessful in demodulating the PUSCH and, via the following PDSCH, executes random access response reception processing. The random access response includes the information specifying the radio resources for transmitting the message 3 of the four-step RACH. Thus, in a case where the terminal apparatus has received the message B including fallback instructions, the message 3 can be transmitted while omitting the messages 1 and 2 of four-step RACH.

As described above, according to the present embodiment, in a case where the base station apparatus detects the preamble portion of the message A but fails in demodulation of the PUSCH portion, the base station apparatus transmits a fallback instruction to the terminal apparatus. In the present embodiment, in a case where the base station apparatus issues an instruction to fallback to four-step RACH, because the base station apparatus has successfully detected the preamble portion transmitted from the terminal apparatus, the terminal apparatus does not need to transmit a random access preamble for four-step RACH. Thus, when a fallback instruction is issued, the base station apparatus transmits to the terminal apparatus the information that specifies the radio resources to be used for the message 3 and a random access response. Accordingly, when two-step RACH ends and four-step RACH starts, the terminal apparatus can start from the message 3. Thus, the time taken to establish a connection between the terminal apparatus and the base station apparatus can be reduced.

Note that the third embodiment may be used in combination with the first embodiment and the second embodiment described above. For example, in a case where connection establishment is unsuccessful despite the number of attempts by the terminal apparatus to transmit the message A reaching a first predetermined number of times, the terminal apparatus may autonomously execute fallback to four-step RACH, or in a case where demodulation of the PUSCH portion is unsuccessful despite the number of times the base station apparatus successfully detected the preamble portion of the message A from the terminal apparatus reaching a second predetermined number of times, the base station apparatus may issue a fallback instruction to the terminal apparatus. Note that the second predetermined number of times may be less than the first predetermined number of times. Also, in a case where connection establishment is unsuccessful despite the elapsed time from when the terminal apparatus transmitted the message A reaching a first predetermined amount of time, the terminal apparatus may autonomously execute fallback to four-step RACH, or in a case where demodulation of the PUSCH portion is unsuccessful despite the elapsed time from when the base station apparatus successfully detected the preamble portion of the message A from the terminal apparatus reaching a second predetermined amount of time, the base station apparatus may issue a fallback instruction to the terminal apparatus. In this case, the second predetermined amount of time may be shorter than the first predetermined amount of time. In this manner, the terminal apparatus can autonomous execute fallback to the four-step RACH in a state in which the base station apparatus has not successfully detected the preamble portion, and in a case where the base station apparatus has successfully detected the preamble portion, a fallback instruction can be issued in the early stages to the terminal apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus that executes a two-step random access procedure or a four-step random access procedure to establish a connection with a base station apparatus, comprising:
one or more processors; and
one or more memories that stores computer-readable instruction for causing, when executed by the one or more processors, the terminal apparatus to:
transmit a first message of the two-step random access procedure including a preamble and predetermined information for connection establishment; and
transmit, in a case where a number of unsuccessful attempts to receive the first message by the base station apparatus exceeds a predetermined number, a second message to be transmitted from the terminal apparatus to the base station apparatus in the four-step random access procedure,
wherein communication between the base station apparatus and the terminal apparatus is performed using at least one of a plurality of bandwidth parts included in a usable frequency band,
the predetermined number is set for each one of the plurality of bandwidth parts, and
in a case where the number exceeds the predetermined number set for one bandwidth part used to transmit the first message from among the plurality of bandwidth parts, the terminal apparatus transmits the second message.

2. The terminal apparatus according to claim 1, wherein the predetermined number is a maximum number of transmission attempts of a random access preamble in a four-step random access procedure.

3. The terminal apparatus according to claim 1, wherein the predetermined number is a number different from a maximum number of transmission attempts of a random access preamble in a four-step random access procedure.

4. The terminal apparatus according to claim 1, wherein the terminal apparatus transmits the second message in response to receiving an instruction transmitted from the base station apparatus in response to the number exceeding the predetermined number.

5. The terminal apparatus according to claim 1, wherein the second message is a preamble transmitted via the first message.

6. The terminal apparatus according to claim 1, wherein the second message is a preamble different from a preamble transmitted via the first message.

7. The terminal apparatus according to claim 4, wherein the second message is a message transmitted after a random access response in the four-step random access procedure.

8. The terminal apparatus according to claim 4, wherein the instruction is included in a reply message to the first message in the two-step random access procedure.

9. The terminal apparatus according to claim 8, wherein the instruction is reported to the terminal apparatus by using first identification information in transmission of a first portion of the reply message; and
the first identification information is different from second identification information used in transmission of the first portion via the reply message in a case where the first message is successfully received.

10. The terminal apparatus according to claim 8, wherein the instruction is reported to the terminal apparatus by transmitting first information via a second portion of the reply message; and
the first information is different from second information transmitted via the second portion via the reply message in a case where the first message is successfully received.

11. The terminal apparatus according to claim 10, wherein the first information is information corresponding a random access response in the four-step random access procedure.

12. A base station apparatus, comprising:
one or more processors; and
one or more memories that stores computer-readable instruction for causing, when executed by the one or more processors, the base station apparatus to report a predetermined number to a terminal apparatus such that the terminal apparatus transmits, in a case where the number of unsuccessful attempts to receive a first message transmitted from the terminal apparatus including a preamble and predetermined information for connection establishment of a two-step random access procedure exceeds a predetermined number, a second message to be transmitted in a four-step random access procedure,
wherein communication between the base station apparatus and the terminal apparatus is performed using at least one of a plurality of bandwidth parts included in a usable frequency band,
the predetermined number is set for each one of the plurality of bandwidth parts, and
in a case where the number exceeds the predetermined number set for one bandwidth part used to transmit the first message from among the plurality of bandwidth parts, the terminal apparatus transmits the second message.

13. The base station apparatus according to claim 12, wherein
the second message is a random access preamble in the four-step random access procedure.

14. The base station apparatus according to claim 12, wherein
in a case where, for the first message, the preamble is detected but a number of unsuccessful attempts to receive the predetermined information exceeds the predetermined number, the base station apparatus transmits to the terminal apparatus a message instructing the terminal apparatus to transmit the second message.

15. The base station apparatus according to claim 14, wherein
the second message is a message transmitted after a random access response in the four-step random access procedure.

16. A control method executed by a terminal apparatus capable of executing a two-step random access procedure or a four-step random access procedure to establish a connection with a base station apparatus, the control method comprising:

transmitting a first message of the two-step random access procedure including a preamble and predetermined information for connection establishment; and transmitting, in a case where a number of unsuccessful attempts to receive the first message by the base station apparatus exceeds a predetermined number, a second message to be transmitted from the terminal apparatus to the base station apparatus in the four-step random access procedure;

wherein communication between the base station apparatus and the terminal apparatus is performed using at least one of a plurality of bandwidth parts included in a usable frequency band, the predetermined number is set for each one of the plurality of bandwidth parts, and in a case where the number exceeds the predetermined number set for one bandwidth part used to transmit the first message from among the plurality of bandwidth parts, the terminal apparatus transmits the second message.

17. A non-transitory computer-readable storage medium that stores a program for causing a computer, provided in a terminal apparatus capable of executing a two-step random access procedure or a four-step random access procedure to establish a connection with a base station apparatus, comprising:

transmitting a first message of the two-step random access procedure including a preamble and predetermined information for connection establishment and transmitting in a case where a number of unsuccessful attempts to receive the first message by the base station apparatus exceeds a predetermined number, a second message to be transmitted from the terminal apparatus to the base station apparatus in the four-step random access procedure, wherein communication between the base station apparatus and the terminal apparatus is performed using at least one of a plurality of bandwidth parts included in a usable frequency band, the predetermined number is set for each one of the plurality of bandwidth parts, and in a case where the number exceeds the predetermined number set for one bandwidth part used to transmit the first message from among the plurality of bandwidth parts, the terminal apparatus transmits the second message.

* * * * *